US012145118B2

(12) United States Patent
Kent et al.

(10) Patent No.: US 12,145,118 B2
(45) Date of Patent: Nov. 19, 2024

(54) SELF-BLENDING BOTTLE

(71) Applicant: Revelution Technology, LLC, Carson, CA (US)

(72) Inventors: Joshua Kent, Carson, CA (US); Christanne Cabal, Carson, CA (US); DanAngelo Cabal, Chesapeake, VA (US); Rebekah Cabal, Chesapeake, VA (US)

(73) Assignee: Revelution Technology, LLC, Carson, CA (US)

( * ) Notice: Subject to any disclaimer, the term of this patent is extended or adjusted under 35 U.S.C. 154(b) by 52 days.

(21) Appl. No.: 17/415,634

(22) PCT Filed: Dec. 16, 2019

(86) PCT No.: PCT/US2019/066505

§ 371 (c)(1),
(2) Date: Jun. 17, 2021

(87) PCT Pub. No.: WO2020/131682

PCT Pub. Date: Jun. 25, 2020

(65) Prior Publication Data

US 2024/0226828 A1 Jul. 11, 2024

Related U.S. Application Data

(60) Provisional application No. 62/782,238, filed on Dec. 19, 2018.

(51) Int. Cl.
*B01F 33/501* (2022.01)
*B01F 23/53* (2022.01)
(Continued)

(52) U.S. Cl.
CPC ........ *B01F 33/50111* (2022.01); *B01F 23/53* (2022.01); *B01F 27/1143* (2022.01);
(Continued)

(58) Field of Classification Search
CPC ................................................ B01F 33/50111
(Continued)

(56) References Cited

U.S. PATENT DOCUMENTS 903,515 A * 11/1908 Snyder ................ A47J 43/1025 366/252
1,410,199 A * 3/1922 Low .................... A47J 43/1025 366/252
(Continued)

FOREIGN PATENT DOCUMENTS

CN 207734016 U 8/2018
EP 0557868 9/1993
(Continued)

OTHER PUBLICATIONS

Taiwan Office Action dated Sep. 5, 2023, for Corresponding Taiwan Patent Application No. 108146745 (5 pages).
(Continued)

*Primary Examiner* — David L Sorkin
(74) *Attorney, Agent, or Firm* — Snell & Wilmer LLP

(57) ABSTRACT

A device for mixing or blending the contents of the device into a liquid or semi-liquid. The device includes a bottle body, a bottle lid connected to a top end of the bottle body, and a mixer located within the bottle body. The mixer may be powered by a motor or by a manual crank turned by a user.

10 Claims, 41 Drawing Sheets

(51) Int. Cl.

| | |
|---|---|
| ***B01F 27/1143*** | (2022.01) |
| ***B01F 27/13*** | (2022.01) |
| ***B01F 27/808*** | (2022.01) |
| ***B01F 27/921*** | (2022.01) |
| ***B01F 27/96*** | (2022.01) |
| ***B01F 35/00*** | (2022.01) |
| ***B01F 35/32*** | (2022.01) |
| ***B01F 35/52*** | (2022.01) |
| ***B65D 47/08*** | (2006.01) |
| ***B65D 47/12*** | (2006.01) |
| ***B65D 51/24*** | (2006.01) |
| ***B65D 51/32*** | (2006.01) |
| *B01F 101/14* | (2022.01) |

(52) U.S. Cl.

CPC ............ *B01F 27/13* (2022.01); *B01F 27/808* (2022.01); *B01F 27/921* (2022.01); *B01F 27/96* (2022.01); *B01F 35/187* (2022.01); *B01F 35/3202* (2022.01); *B01F 35/522* (2022.01); *B65D 47/089* (2013.01); *B65D 47/122* (2013.01); *B65D 51/242* (2013.01); *B65D 51/32* (2013.01); *B01F 2101/14* (2022.01)

(58) Field of Classification Search

USPC ................................. 366/129, 130, 247, 252

See application file for complete search history.

(56) References Cited

U.S. PATENT DOCUMENTS

| | | | | | |
|---|---|---|---|---|---|
| 1,753,121 | A * | 4/1930 | Kerr | A61C 9/0026 | 366/252 |
| 1,762,421 | A * | 6/1930 | Pyle | A47J 43/1025 | 366/252 |
| 2,257,238 | A | 9/1941 | Hexter | | |
| 3,285,584 | A * | 11/1966 | Goldfarb | A47J 43/1025 | 366/252 |
| 3,619,754 | A | 11/1971 | Fuchs | | |
| 3,704,007 | A | 11/1972 | Kroeger | | |
| 4,185,072 | A | 1/1980 | Puderbaugh et al. | | |
| 5,199,788 | A | 4/1993 | Stallings | | |
| 9,004,745 | B1 | 4/2015 | Hajianpour | | |
| 2015/0196881 | A1 | 7/2015 | Rabbi | | |
| 2017/0105581 | A1 | 4/2017 | Enghard | | |
| 2017/0173544 | A1 | 6/2017 | Laby | | |
| 2017/0258188 | A1 | 9/2017 | Luo | | |

FOREIGN PATENT DOCUMENTS

| | | | |
|---|---|---|---|
| EP | 0557868 | A1 | 9/1993 |
| JP | 3015178 | U | 8/1995 |
| JP | 1996080243 | A | 3/1996 |
| JP | 2007044246 | A | 2/2007 |
| JP | 2009539590 | A | 11/2009 |

OTHER PUBLICATIONS

International Search Report and Written Opinion (mailing date May 14, 2020) for International PCT Patent Application No. PCT/US19/66505, filed on Dec. 16, 2019.

* cited by examiner

SELF-BLENDING BOTTLE

CROSS REFERENCE TO RELATED APPLICATIONS

This application claims priority to U.S. Provisional Patent Application No. 62/782,238, entitled "Self-Blending Bottle," filed Dec. 19, 2018, the contents of which are herein incorporated by reference in its entirety.

BACKGROUND

1. Field

This specification relates to a system, apparatus, and a method for storing and blending liquids in a bottle.

2. Description of the Related Art

Bottles may be used to store liquids. Conventional bottles may be made of plastic, stainless steel, or aluminum, for example, and may store hot or cold liquids.

SUMMARY

What is described is a bottle for mixing or blending contents of the bottle into a liquid or semi-liquid. The bottle includes a bottle body defining a cavity for receiving the contents of the bottle. The bottle includes a bottle lid configured to cover a top opening of the bottle body. The bottle includes a mixer located within the bottle body for mixing or blending the contents of the bottle. The bottle includes a crank having a handle and a lever, being connected to the bottle lid, and being configured to turn around a central axis of the bottle, the turning causing the mixer to spin and mix or blend the contents of the bottle. The bottle includes a shaft connecting the crank and the mixer, the shaft located along the central axis of the bottle and configured to turn when the crank is turned, the mixer being removably attached to the shaft via respective threads located on the shaft and the mixer. The handle of the crank is connected to a first end of the lever and the second end of the lever is coupled to a hub. The crank is configured to be in a stowed position or a deployed position. The handle of the crank is located in a slot of the bottle lid when the crank is in the stowed position.

In some embodiments, the lever is coupled to the hub via a pin, and the pin is configured to allow the lever to rotate around an axis perpendicular to the central axis when the crank moves between the stowed position and the deployed position.

In some embodiments, the hub includes a bumper configured to prevent the lever of the crank from contacting a cap covering a mouthpiece of the bottle lid when the crank is being turned around the central axis.

In some embodiments, the bottle further includes a removable filter connected to the mouthpiece.

In some embodiments, the bumper includes a top surface configured to contact a bottom surface of the lever when the crank is in the deployed position to establish a channel providing clearance around the cap when the crank is turned.

In some embodiments, the slot is located on an opposite side of the bottle lid as the cap.

In some embodiments, the mixer is located proximal to a bottom end of the bottle body within the bottle body and a tip end of the mixer is located below a base end of the mixer, the base end of the mixer attached to the shaft.

In some embodiments, the mixer is a helix mixer having a tip end and a base end. The mixer includes a top having a circular shape and located proximal to the tip end. The mixer also includes a plurality of rods connected to a perimeter of the top and equally spaced around a circumference of the top. The mixer also includes a plurality of arms located proximal to the base end, the arms protruding perpendicularly outwardly from a central shaft of the mixer, each arm of the plurality of arms connected to a respective rod of the plurality of rods, the rods having a twisting shape around a circumference of the mixer.

In some embodiments, the mixer is a cone mixer having a tip end and a base end. The mixer includes a plurality of arms connected at a first end proximal to the tip end of the mixer and connected at a second end proximal to the base end of the mixer, the plurality of arms equally spaced around a circumference of the mixer. Each arm of the plurality of arms protrudes from a shaft of the mixer, extends toward the base end of the mixer, bends toward the tip end of the mixer and away from the shaft of the mixer, bends toward the tip end of the mixer and toward the shaft of the mixer, and connects to the tip end of the mixer.

In some embodiments, the bottle further includes a bottom ring connected to a bottom end of the bottle body and configured to prevent the bottle from sliding along a surface. The bottle includes an attaching ring located between the bottle lid and the bottle body and having an opening configured to receive a carabiner or a paracord. The bottle includes a grip located on the bottle lid and configured to aid in a user grasping the bottle lid to remove and attach the bottle lid to and from the bottle body. The bottle includes a gearbox located within the bottle lid configured to translate a single revolution of the crank to multiple revolutions of the shaft.

In some embodiments, the bottle further includes a storage container configured to engage a bottom end of the bottle body, the storage container having a removable lid to protect contents of the storage container and configured to store ingredients to be mixed or blended using the bottle.

Also described is a bottle for mixing or blending contents of the bottle into a liquid or semi-liquid. The bottle includes a bottle body defining a cavity for receiving the contents of the bottle and having a top opening and a bottom opening. The bottle also includes a bottle lid configured to cover the top opening of the bottle body. The bottle also includes a mixer located within the bottle body for mixing or blending the contents of the bottle. The bottle also includes a power device configured to cover the bottom opening of the bottle body, the power device having a motor configured to removably couple to the mixer and turn the mixer about a central axis of the bottle, a battery configured to power the motor to cause the mixer to mix or blend the contents of the bottle, and an on/off switch configured to control powering of the motor. The bottle also includes a base configured to cover the power device.

In some embodiments, the bottle further includes one or more sensors configured to detect when the bottle lid is not attached to the bottle body or when the power device is not attached to the bottle body. The motor is disabled from turning the mixer when the one or more sensors detect when the bottle lid is not attached to the bottle body or when the power device is not attached to the bottle body.

In some embodiments, the bottle body includes a slope at the top opening, the slope assisting grasping of the bottle at the sloped location and assisting in separating the bottle lid from the bottle body by creating additional surface area for the user to grasp.

In some embodiments, the mixer is an auger or a whisk.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

FIGS. 31A-32B illustrate the manual bottle with a cone mixer, according to various embodiments of the invention.

DETAILED DESCRIPTION

Figure 1:
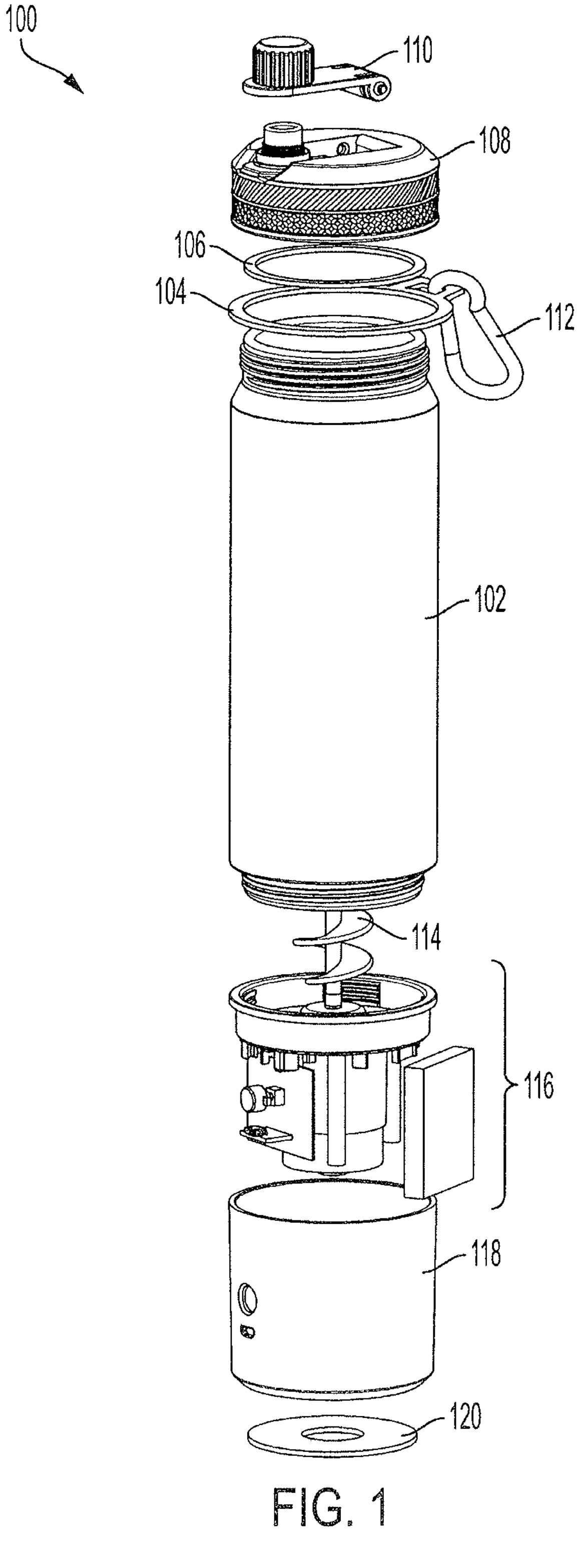
FIG. 1 illustrates an exploded view of a motorized bottle, according to various embodiments of the invention.

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

The systems, apparatuses, and methods described herein are related to a bottle capable of blending or mixing a liquid and storing the blended or mixed liquid. Conventional bottles may only store liquids. Conventionally, in order to concoct a beverage having solid ingredients that are blended into a liquid or semi-liquid form, a separate blender must be used. Use of a separate blender is not only time-consuming due to the extra cleaning and preparation associated with the separate blender, but also inefficient, as the separate blender must be stored and occupies storage space in a kitchen or home. Other bottles may contain agitators made of wire to mix powders with liquid, but these are largely ineffective due to the flimsy nature of the wire agitators. Instead of blending the powder with the liquid, the powder becomes clumped within the wire agitator. It is also impossible for these wire agitators to blend solid ingredients, such as fruit or ice.

The self-blending bottle described herein includes a mixer within the bottle so that solid ingredients may be blended into a liquid or semi-liquid form. The mixer may also better incorporate powders into liquid, compared to conventional bottles. The self-blending bottle may be powered with a motor or the manual turning of a crank by a user.

The self-blending bottle may be used to create a well-blended beverage anywhere, including places where electricity and a blender are not easily accessible, such as at a gym, an office, an outdoor trail, or in a vehicle.

FIG. 1 illustrates an exploded view of the self-blending (or "motorized" or "electric") bottle 100 that is electrically powered. The self-blending bottle 100 includes a bottle body 102, a bottle lid 108, a mouthpiece lid 110, a power device 116, and a base 118.

The bottle body 102 may be made of aluminum, stainless steel, or any other material configured to thermally insulate the contents of the bottle 100. The bottle body 102 may be double-walled in order to improve the insulating capabilities of the bottle 100. The bottle body 102 may have a top opening to be attached to the bottle lid 108 and a bottom opening to be attached to the base 118.

Between the bottle body 102 and the bottle lid 108 is an attaching ring 104 and a sealing ring 106. The sealing ring 106 is configured to form a seal between the bottle body 102 and the bottle lid 108, and may be made of silicone, rubber, or any other sealing material. The attaching ring 104 is configured to connect the bottle 100 to an attaching device, such as a carabiner 112.

The bottle lid 108 includes a mouthpiece lid 110 configured to cover and protect a mouthpiece of the bottle 100. The mouthpiece lid 110 may be fixedly attached to the bottle lid 108 so that the mouthpiece lid 110 may not be misplaced when not engaged with the bottle lid 108. The mouthpiece lid 110 may be attached to the bottle lid 108 by a hinge, a cord, or any other device allowing the mouthpiece lid 110 to move away from the mouthpiece in a first position and cover the mouthpiece in a second position.

The power device 116 is connected to a mixer 114 (shown as an auger). The power device 116 uses electricity to power the mixer 114 to mix or blend the contents of the bottle 100 into a liquid or semi-liquid form.

The base 118 includes a bottom ring 120 made of a material having a relatively high coefficient of friction (e.g., rubber), so that the bottle 100 is prevented from slipping along a surface.

The mouthpiece lid 110 is located above the bottle lid 108, which is located above the sealing ring 106, which is located above the attaching ring 104, which is located above the bottle body 102, which is located above the power device 116, which is located above the base 118, which is located above the bottom ring 120.

The bottle lid 108, the sealing ring 106, the attaching ring 104, the bottle body 102, the power device 116, the base 118 and the bottom ring 120 are all generally circular or annular around a central axis of the bottle 100.

Figure 2:
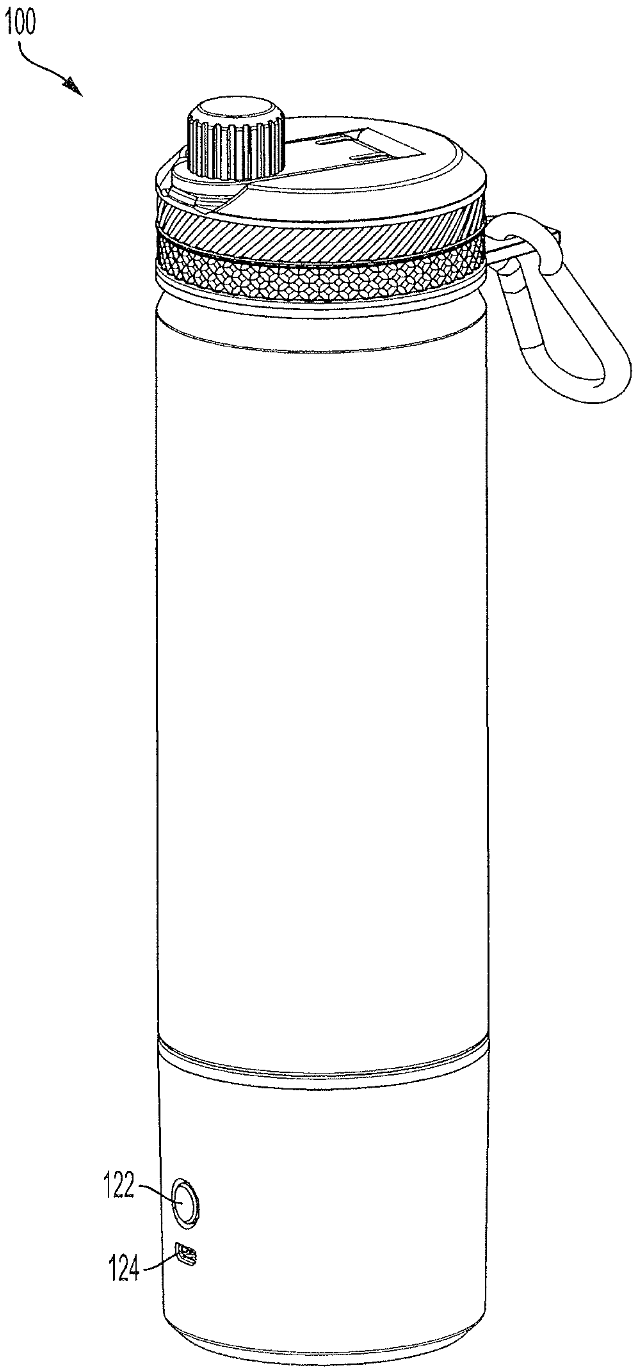
FIG. 2 illustrates a perspective view of the motorized bottle, according to various embodiments of the invention.

FIG. 2 illustrates an on/off switch (i.e., power switch) 122 and a charging port 124 of the bottle 100. The power switch 122 may be pressed or held to be activated. In some embodiments, the power switch 122 is voice-activated or activated based on a motion or gesture performed by the user. The charging port 124 may be connected to a power source via a universal serial bus (USB) cable. In some embodiments, the charging port 124 is waterproof. In some embodiments, the charging port 124 is configured to receive a cover to protect the charging port 124 from collecting debris.

The location of the power switch 122 and the charging port 124 may be on a side wall of the base 118, and perpendicular to the bottom ring 120 and the top and bottom surfaces of the bottle 100.

Figure 3A:
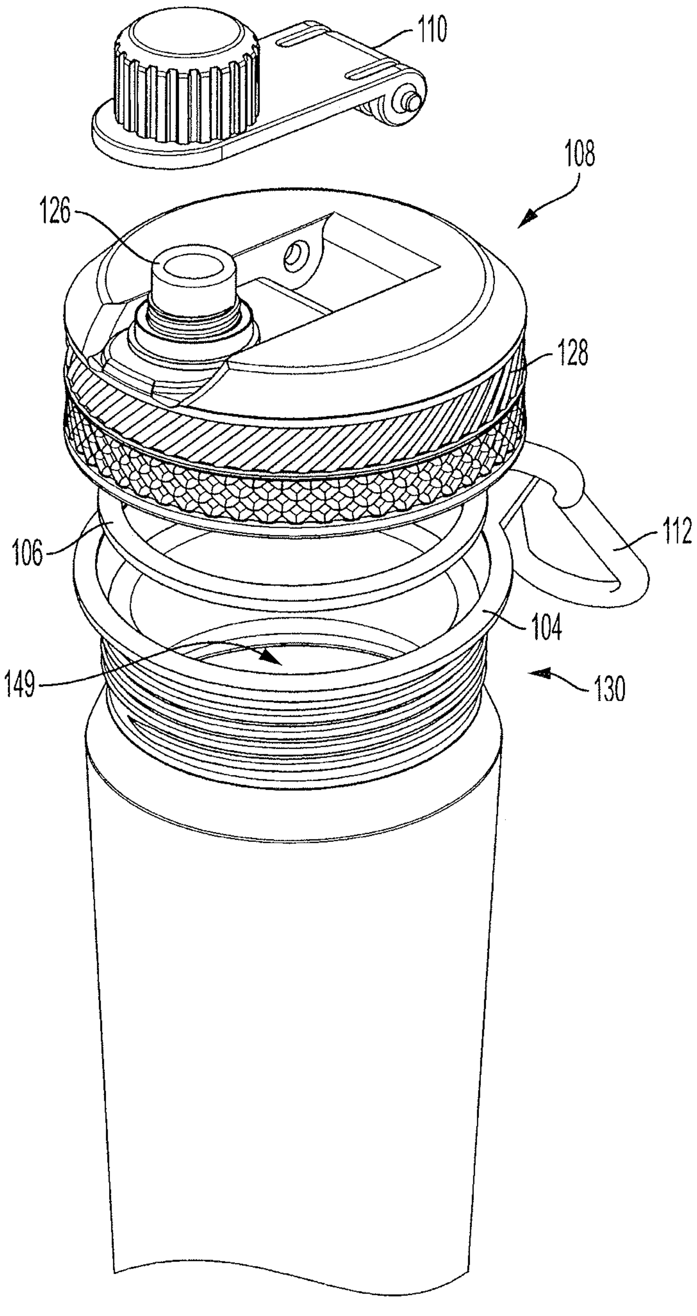
FIGS. 3A, 3B, and 3C illustrate exploded views of the bottle lid, according to various embodiments of the invention.

FIG. 3A illustrates an exploded view of the top of the bottle 100. The bottle body 102 defines a cavity 149 for storing and mixing liquid. The bottle lid 108 covers a top opening of the bottle body 102 and includes a mouthpiece 126 and a gripping surface 128. The mouthpiece 126 is where the contents of the bottle 100 may exit the bottle 100. The gripping surface 128 may be configured to provide increased grip for the user to twist the bottle lid 108 to remove the bottle lid 108 from the bottle body 102. The gripping surface 128 may be made of rubber, silicone, or any other relatively high-friction material. The gripping surface 128 may surround a circumference of the bottle lid 108. The gripping surface 128 may have a pattern to increase contact area with a user's hand when the bottle lid 108 is being gripped and turned to disengage the bottle lid 108 from the bottle body 102.

The sealing ring 106 may provide a seal between the bottle lid 108 and the bottle body 102 to prevent leakage of liquids when the bottle 100 is being tilted and when contents of the bottle 100 exit the bottle 100 via the mouthpiece 126.

The bottle body 102 may have threads 130 and the bottle lid 108 may have corresponding threads to secure the bottle lid 108 to the bottle body 102.

Figure 3B:
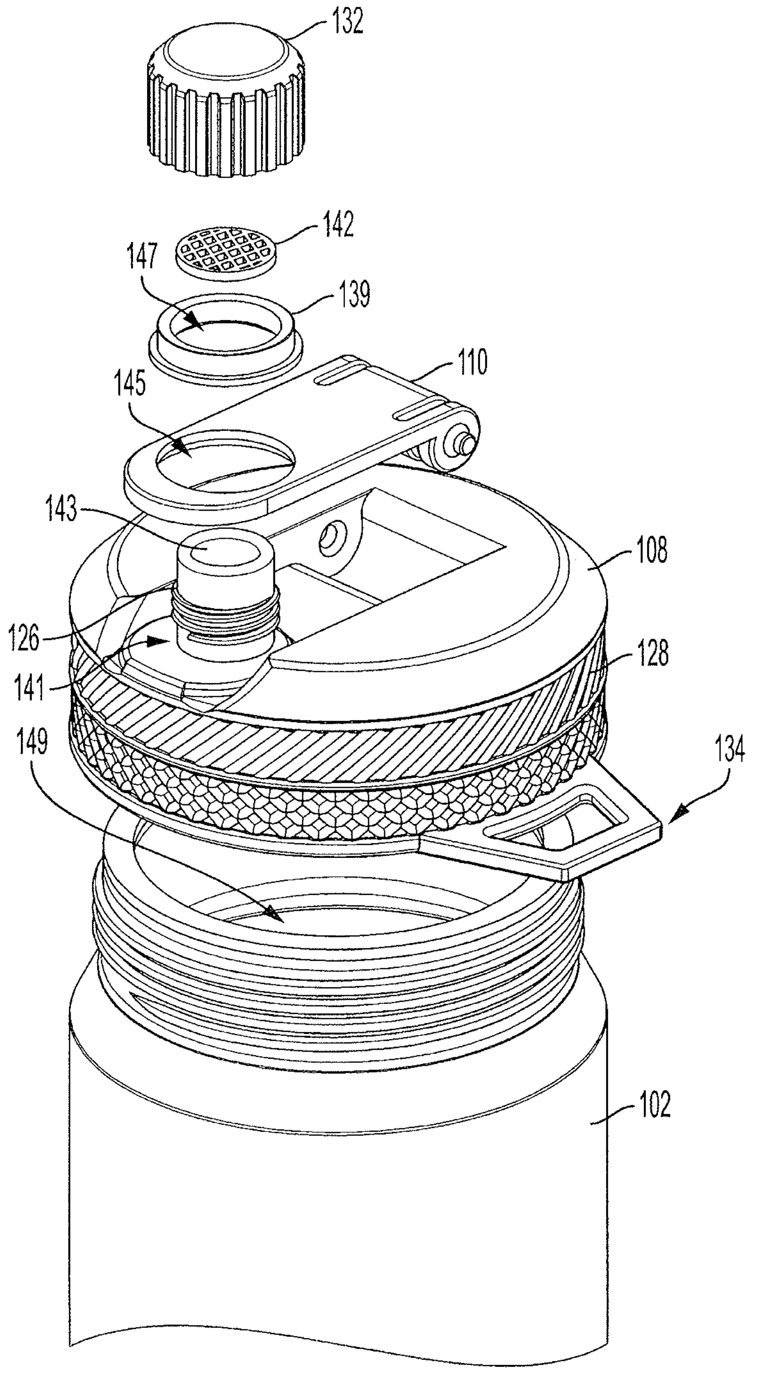

FIG. 3B illustrates an exploded view of the top of the bottle 100 according to another embodiment. As described herein, the bottle lid 108 covers a cavity 149 at a top opening of the bottle body 102 and includes a mouthpiece 126 and a gripping surface 128. There also may be a sealing ring, similar to sealing ring 106 shown in FIG. 3A.

The mouthpiece lid 110 may be connected to a mouthpiece cap 132. The mouthpiece cap 132 may cover a mouthpiece lid opening 145 and also the mouthpiece 126, which fits through the mouthpiece lid opening 145 when the mouthpiece lid 110 is closed. The mouthpiece 126 has a mouthpiece opening 143 where the contents of the bottle 100 may exit the bottle 100. The mouthpiece opening 143 may be covered by a filter 142. The filter 142 may have a filter grade corresponding to the size of the openings within the filter 142. The filter 142 prevents objects (e.g., chunks of fruit, ice, or other solids) that have a size greater than the filter grade from escaping the bottle 100, while allowing liquids and objects having a size less than the filter grade to escape the bottle 100.

The filter 142 may be attached to the mouthpiece 126 by adhesive, interference fit, a connector, or may be formed integrally with the mouthpiece 126 in a mold. A mouthpiece sealing ring 139 (having an opening 147 corresponding to the other openings 145 and 143) may prevent liquid from escaping the bottle 100 via the mouthpiece 126 when the mouthpiece lid 110 is in the closed position. The mouthpiece sealing ring 139 may be a part of the mouthpiece cap 132, attached to the mouthpiece 126, or attached to the mouthpiece lid 110 around the mouthpiece lid opening 145.

The bottle body 102 may have threads 130 and the bottle lid 108 may have corresponding threads to secure the bottle lid 108 to the bottle body 102. The mouthpiece 126 may have threads 141 and the mouthpiece cap 132 may have corresponding threads to secure the mouthpiece lid 110 to the mouthpiece 126 when the mouthpiece lid 110 is in the closed position.

An attaching loop 134 may be formed integrally with the bottle lid 108 and may serve similar functionality as the attaching ring 104. In some embodiments, the attaching loop 134 is part of an attaching ring, and the attaching ring may rotate about the circumference of the bottle lid 108, via a groove located around the circumference of the bottle lid 108.

Figure 3C:
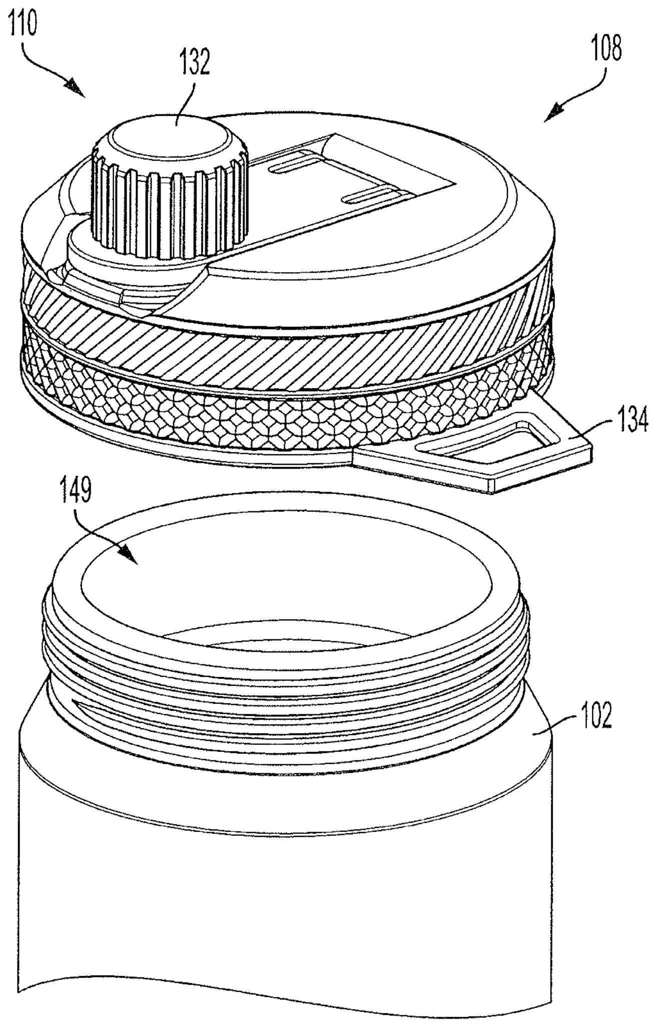

FIG. 3C illustrates the bottle lid 108 of FIG. 3B in non-exploded form, showing the closed position of the mouthpiece lid 110, covering the mouthpiece 126.

Figure 4:
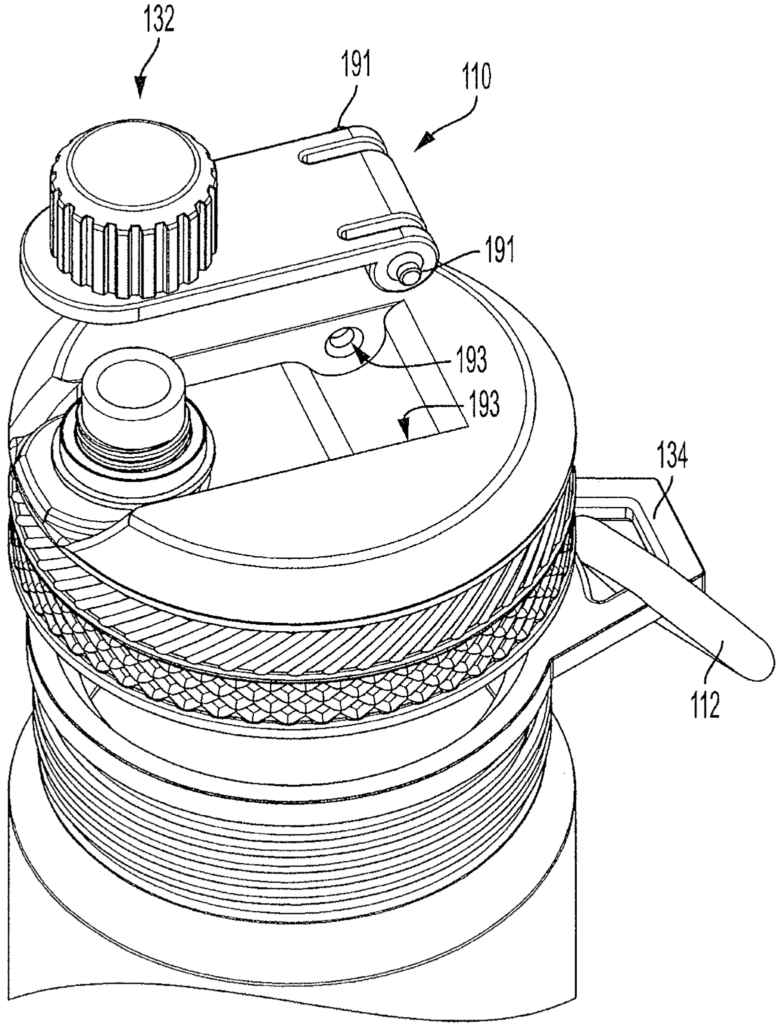
FIG. 4 illustrates the mouthpiece lid, according to various embodiments of the invention.

FIG. 4 shows the mouthpiece lid 110 having a mouthpiece cap 132. The mouthpiece cap 132 may be turned to secure the mouthpiece lid 110 to the mouthpiece 126, thus securing the mouthpiece lid 110 to the bottle lid 108. FIG. 4 also shows the attaching ring 104 having an attaching loop 134 to receive the attaching device, such as a carabiner 112.

The mouthpiece lid 110 may have pegs 191 configured to be received by slots 193 of the bottle lid 108 that allow the mouthpiece lid 110 to pivot about an axis established by the pegs 191, from the closed position to the open position, and any positions therebetween.

The mouthpiece lid 110 may pivot on an axis that is perpendicular to the central axis of the bottle. The pivoting axis of the mouthpiece lid 110 may be established by the pegs 191.

Figure 5:
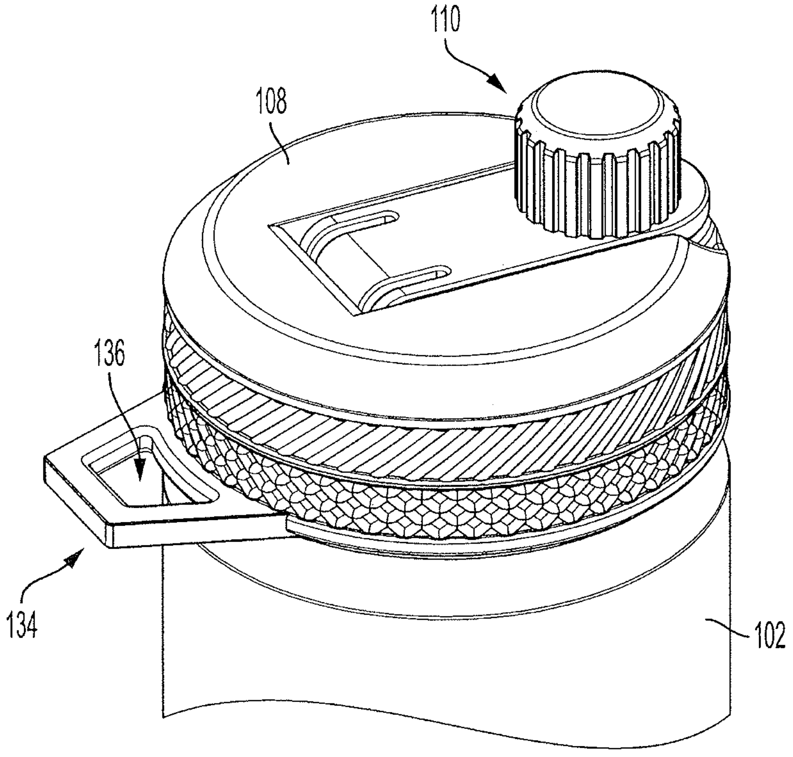
FIG. 5 illustrates the attaching ring, according to various embodiments of the invention.

FIG. 5 shows the attaching loop 134 of the attaching ring 104. The attaching loop 134 has an opening 136 where the attaching device may be inserted.

Figure 6:
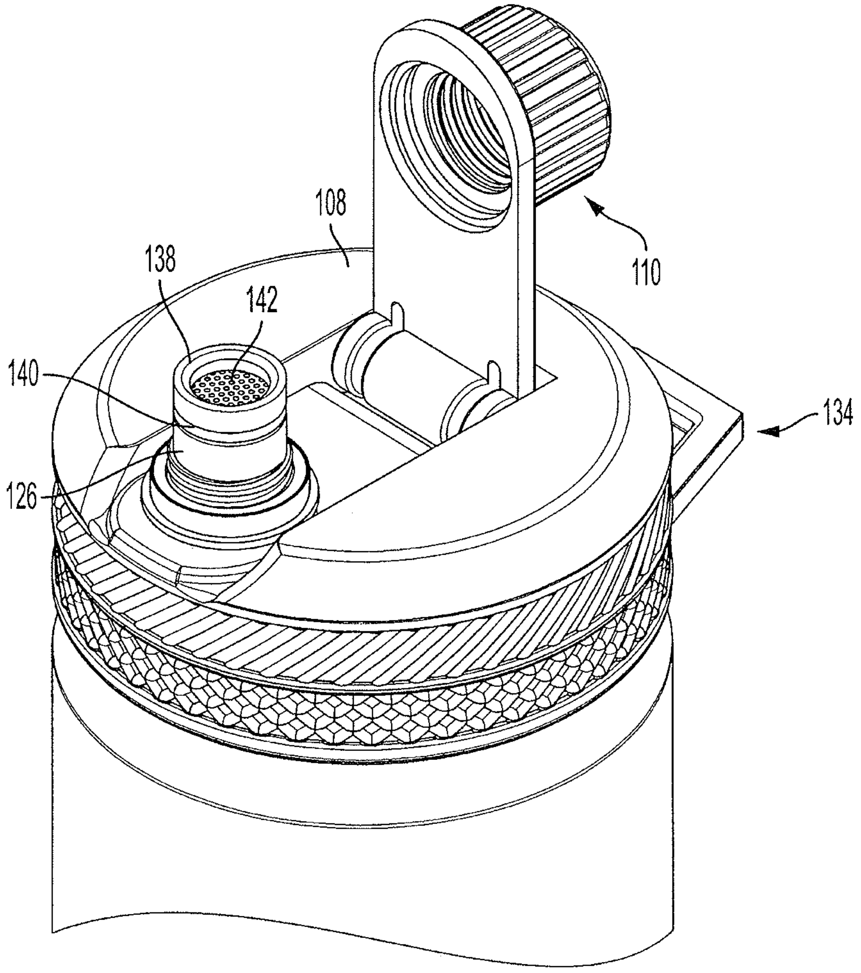
FIGS. 6 and 7 illustrate the filter, according to various embodiments of the invention.

FIG. 6 illustrates the mouthpiece having a filter 142, a top cap 138, and a sealing ring 140. The sealing ring 140 prevents leaks between the bottle lid 108 and the top cap 138. The filter 142 prevents chunks larger than the openings of the filter 142 from exiting the bottle 100, as described herein.

Figure 7:
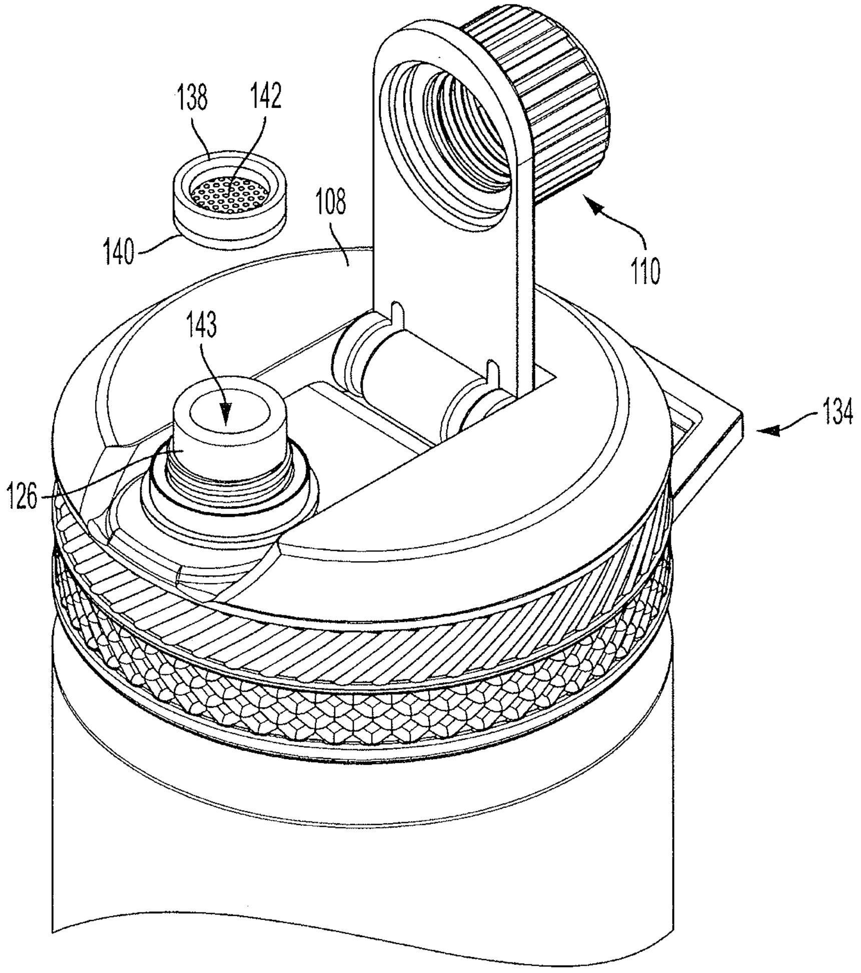

FIG. 7 shows the mouthpiece filter separated from the mouthpiece 126. The top cap 138, the sealing ring 140, and the filter 142 may be removed. The filter 142 may be removed to be cleaned or exchanged for another filter 142. There may be multiple filters 142 of varying straining opening sizes that may be used. The top cap 138 and sealing ring 140 may be attached to the bottle lid 108 by being screwed on or by being pushed on via interference fit.

Figure 8:
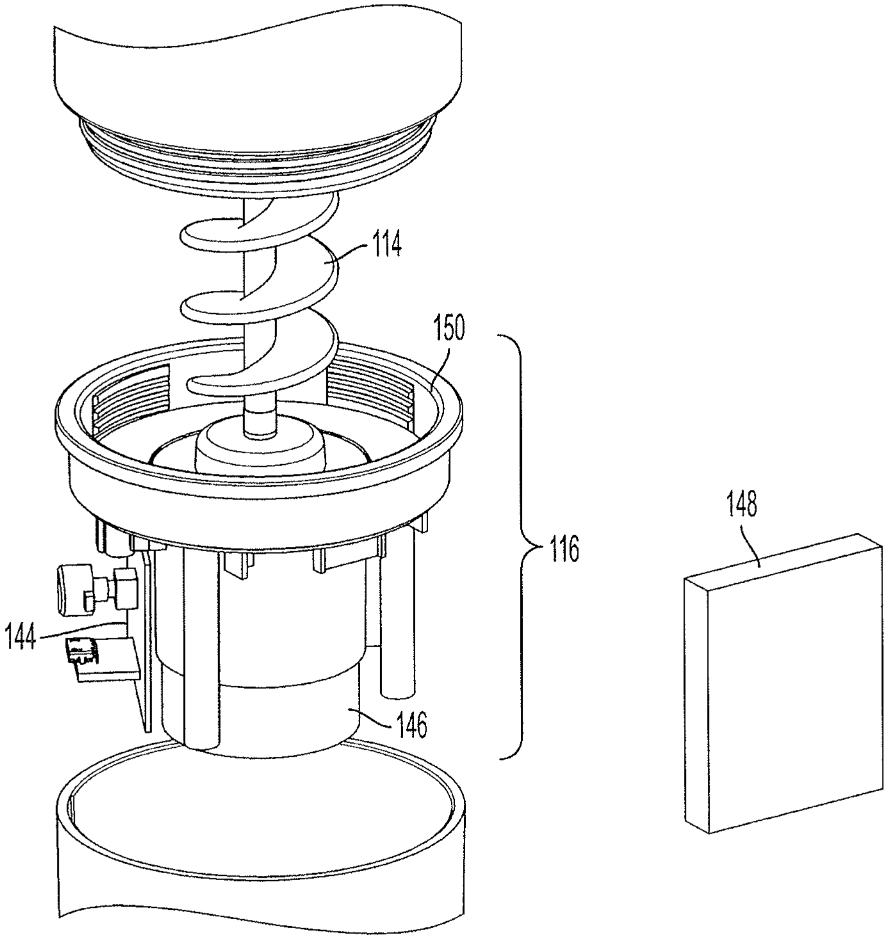
FIGS. 8 and 9 illustrate the power device, according to various embodiments of the invention.

FIG. 8 illustrates the power device 116. The power device 116 includes a frame 150, a printed circuit board 144, a motor 146, and a battery 148. Pressing the power switch 122 may activate the printed circuit board 144, causing the motor 146 to be powered by the battery 148 to turn the mixer 114. The printed circuit board may be configured to power the mixer 114 for a predetermined amount of time. Pressing the power switch 122 before the time has elapsed may cause the mixer 114 to stop. The turning speed of the motor 146 and the length of time the mixer 114 is activated for may be adjusted by the user. Battery 148 may be any rechargeable battery. Battery 148 may be charged via a connection to a power grid (e.g., an electrical outlet) or a connection to another battery or power source (e.g., a solar charging device).

In some embodiments, the printed circuit board 144 instructs the motor 146 to periodically blend or mix the contents of the bottle 100 to maintain the consistency of the liquid or semi-liquid inside the bottle 100. The printed circuit board 144 may vary the torque provided by the motor 146 based on the contents of the bottle 100. For example, greater torque may be provided when ice is present and less torque may be provided when a powder and liquid are present. The contents of the bottle may be automatically identified or may be identified by the user. In some embodiments, the printed circuit board 144 includes a processor configured to execute instructions stored on a non-transitory memory. In some embodiments, the printed circuit board 144 contains a series of hardware control circuits for achieving the functionality described herein.

As will be shown further herein, the mixer 114 may be removably attached to the power device 116. In some embodiments, the mixer 114 has an opening at a first end of the shaft of the mixer 114, and the opening includes threading around the interior of the opening. The threading is configured to receive corresponding threading around a shaft of the motor 146. Thus, the mixer 114 (shown as an auger) may be removed and replaced with another mixer of a different configuration (e.g., a whisk).

The battery 148 and the printed circuit board 144 may be arranged along the length of the bottle 100 (i.e., perpendicular to the bottom and top surfaces of the bottle). This may save space within the power device 116 and allow for compact design of the power device 116.

Figure 9:
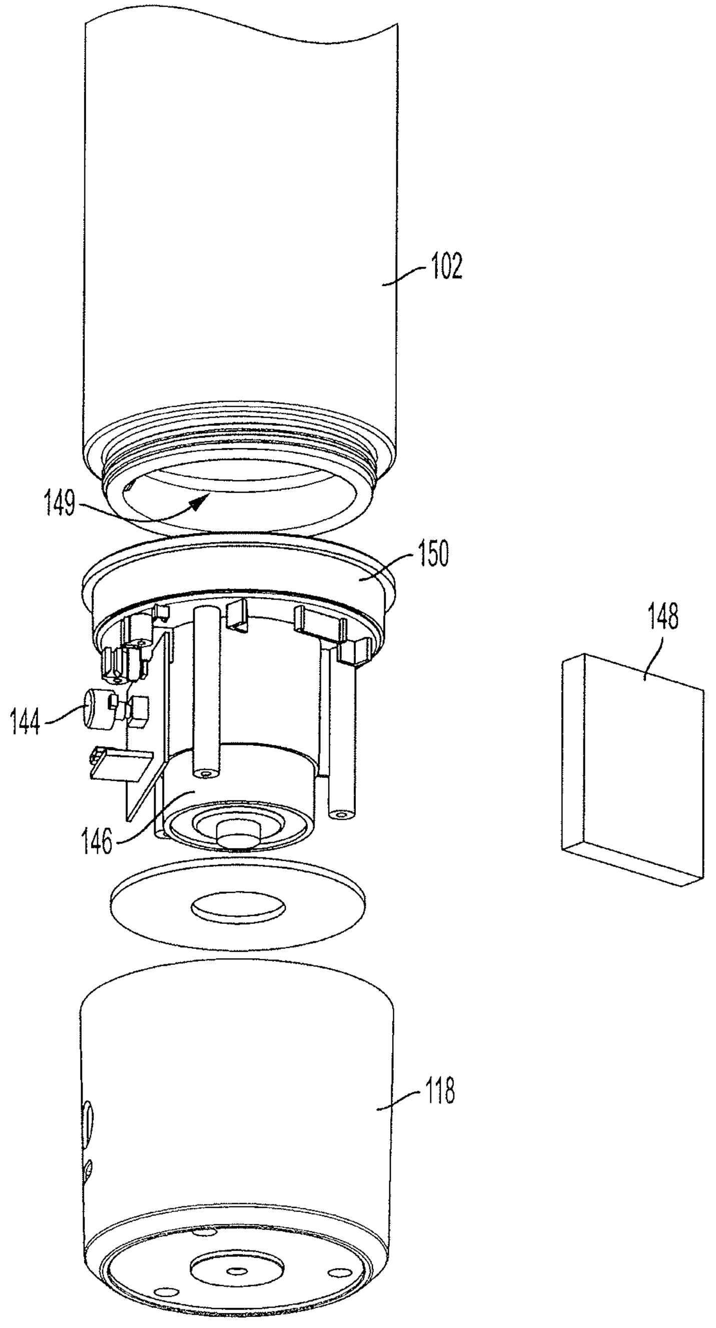

FIG. 9 shows an exploded view of the power device 116. The printed circuit board 144, motor 146, and the battery 148 may attached to the frame 150, which may be secured to the bottle body 102 by the base 118. In some embodiments, the power device 116 is assembled separately and then fixedly attached to the base 118 via connectors (e.g., screws) or adhesive, and then power device 116 is attached to the bottle body 102.

The power device 116, namely the frame 150 of the power device 116, attaches to the bottom end of the bottle body 102 to cover the cavity 149 at a bottom opening of the bottle body. There may be threads and sealing rings located between the frame 150 and the bottle body 102 that prevent leakage of fluids within the bottle body 102 from escaping the cavity 149 via the bottom opening of the bottle body 102.

In some embodiments, there are one or more sensors configured to detect when the power device 116 and/or the base 118 is separated from the bottle body 102. When the one or more sensors detect that the power device 116 and/or the base 118 is separated from the bottle body 102, power to the motor may be automatically disabled, preventing the mixer from being activated and potentially injuring the user. The one or more sensors may be located proximal to the base 118 and/or the power device 116 or proximal to a bottom end of the bottle body 102.

In some embodiments, there are one or more sensors configured to detect when the bottle lid is separated from the bottle body 102. When the one or more sensors detect that the bottle lid is separated from the bottle body 102, power to the motor may be automatically disabled, preventing the mixer from being activated and potentially injuring the user. The one or more sensors may be located proximal to the bottle lid or proximal to the top end of the bottle body 102.

Figure 10A:
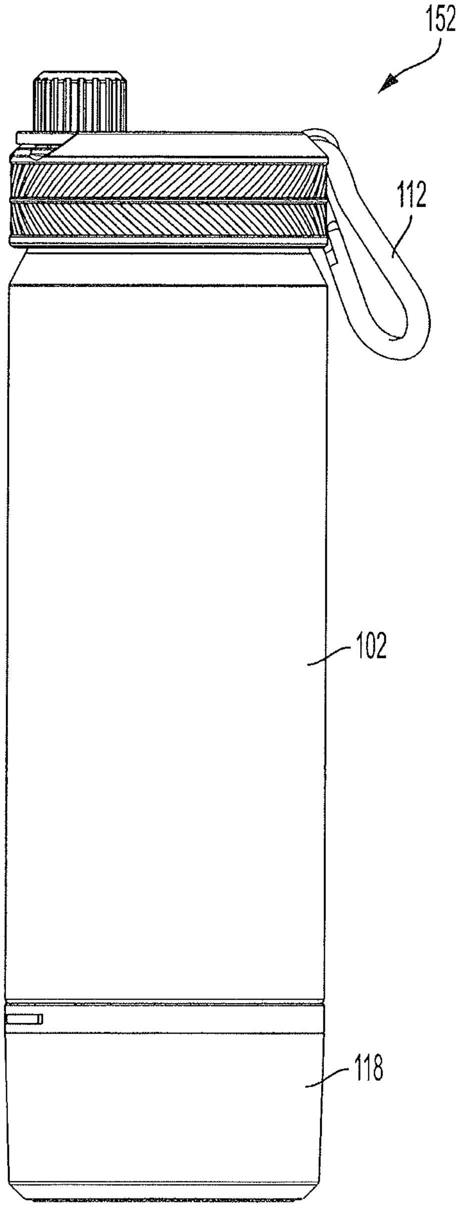
FIGS. 10A and 10B illustrate the motorized bottle, according to various embodiments of the invention.
Figure 10B:
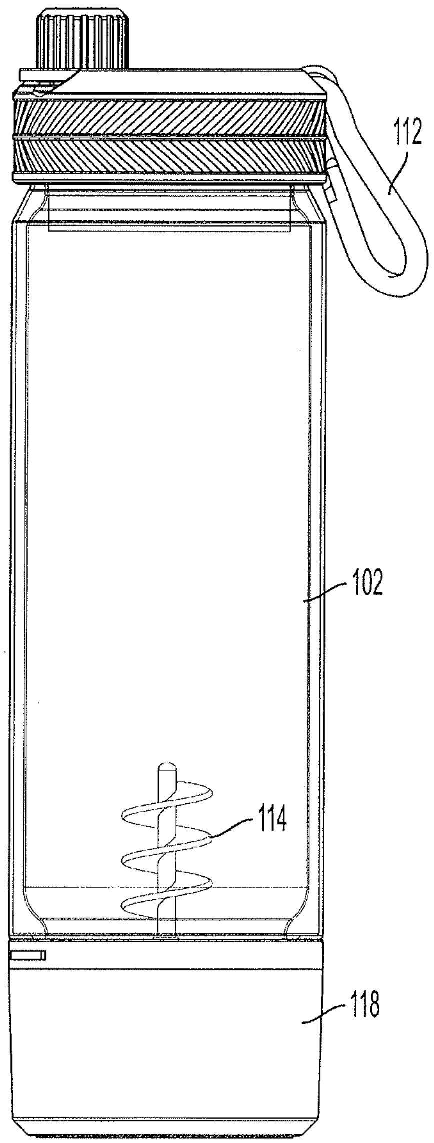

FIG. 10A illustrates the exterior of the bottle 100 and FIG. 10B illustrates the interior of the bottle 100 by showing a transparent bottle body 102. The mixer 114 is shown within the bottle body 102. In some embodiments, instead of an attaching ring 104 connecting the attaching device to the bottle 100, an integrally formed attaching channel 152 connects the attaching device to the bottle 100.

Figure 10C:
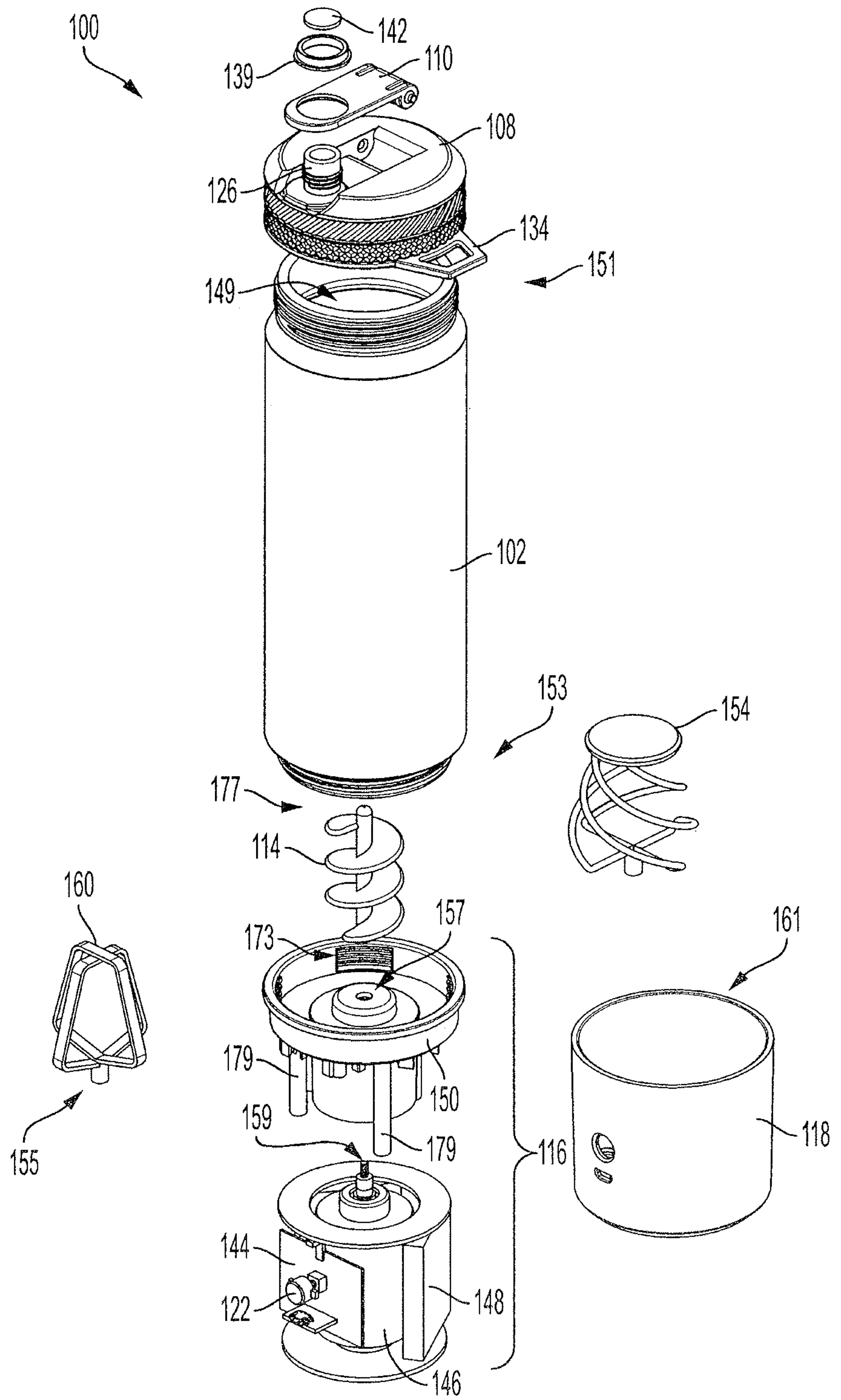
FIG. 10C is an exploded view of the motorized bottle, according to various embodiments of the invention.

FIG. 10C illustrates an exploded view of a bottle 100. The bottle 100 includes the bottle body 102 defining a cavity 149 and having a top opening 151 and a bottom opening 153. The bottle body 102 has threading proximal to the top opening 151 as well as threading proximal to the bottom opening 153. The threading of the bottle body 102 is configured to be received by corresponding threading on the interior surfaces of the bottle lid 108 and the frame 150.

As described herein, the bottle lid 108 includes a mouthpiece lid 110, a filter 142, a sealing ring 139, a mouthpiece 126, and an attaching loop 134. Also as described herein, the power device 116 includes a frame 150, a motor 146, a printed circuit board 144, and a battery 148. Also shown is the power switch 122 connected to the printed circuit board 144, as well as the base 118, each as described herein.

The base 118 defines a cavity 161. The cavity 161 of the base 118 is configured to receive the power device 116. The power device 116 may be fixedly or removably attached to the base 118 within the cavity 161 of the base. The frame 150 may include one or more vertical posts 179 configured to surround and frame the components of the power device 116 and attach to the base 118.

The mixer 114 (and other mixers 154 and 160) have a tip end 177 and a base end 173. The base end 173 of the mixer 114 contacts the motor 146. The motor 146 includes a shaft 159. The shaft 159 may include external threading configured to engage with internal threading of a shaft of the mixer 114 located at the base end 173 of the mixer 114. This allows for the mixer 114 to be removed and replaced with alternate mixers 154 and 160. The shaft 159 of the motor 146 extends through an opening 157 of the frame 150. The opening 157 of the frame 150 may include one or more sealing features to prevent liquid from leaking onto the motor 146 and other components of the power device 116.

The opening 157, the shaft of the motor 146, and the mixer 114 may all be located along the central axis of the bottle 100.

Figure 10D:
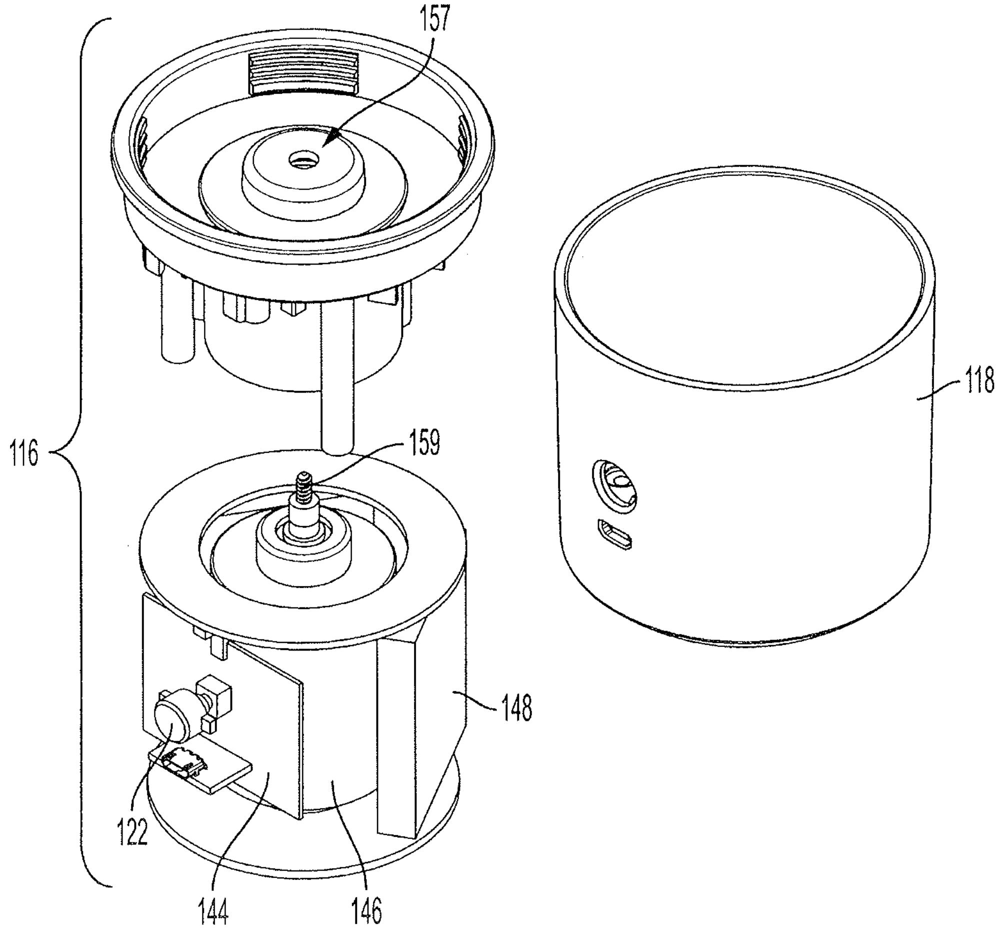
FIG. 10D illustrates the power device, according to various embodiments of the invention.

FIG. 10D illustrates a more detailed view of the power device 116 and the base 118 of the exploded view shown in FIG. 10C.

Figure 11:
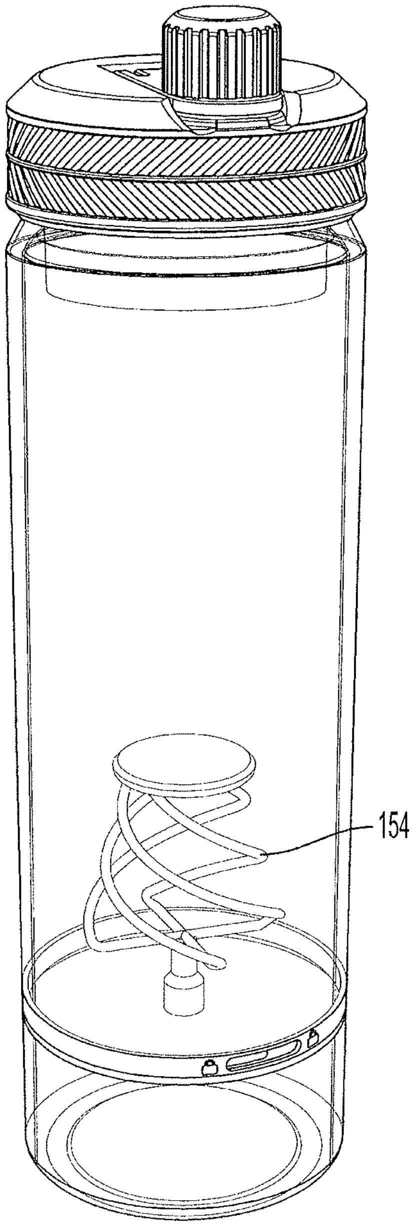
FIGS. 11 and 12 illustrate the helix mixer, according to various embodiments of the invention.

FIG. 11 illustrates an alternate mixer 154 that may be used. The mixer 114 may be a general-purpose mixer used to mix powders (e.g., protein powder, peanut butter powder, supplement powder) with liquids or to blend solids (e.g., fruits, vegetables, nuts, ice) with liquids. The mixer 154 may be used to mix powders with liquids.

Figure 12:
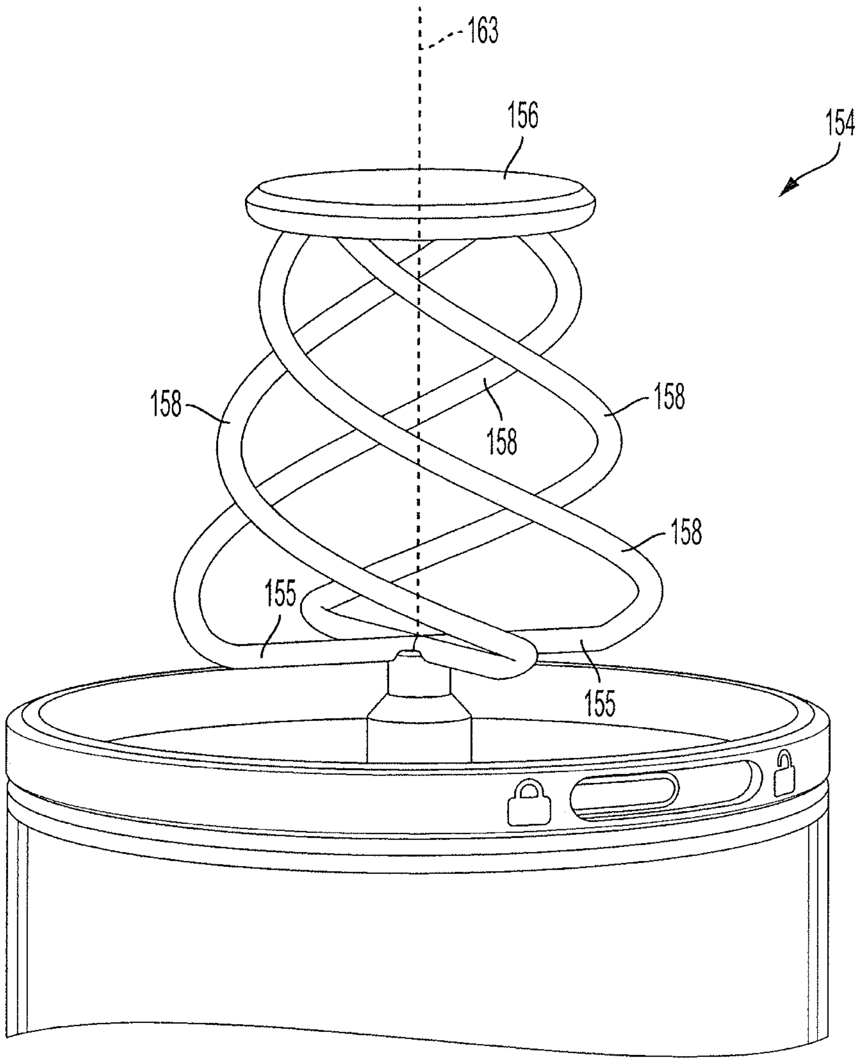

FIG. 12 illustrates a detailed view of the mixer 154. The mixer 154 may spin about a central axis 163 that the motor shaft is located on. The mixer 154 has a top 156 that connects four wires or rods 158 that are arranged in a helix shape. The wires or rods 158 rotate to effectively and efficiently mix the powder with the liquid. The top 156 may be circular in shape, and may establish a first plane. The rods 158 may be connected to a perimeter of the top 156 around a circumference of the top 156, and may be equally spaced apart around the top 156. The rods 158 may twist downward toward the motor 146 and may meet corresponding arms 155 directed outward from the shaft of the mixer 154.

The shaft of the mixer 154 is removably connected to the motor 146 by threads, as described herein. The shaft of the mixer 154 is perpendicular to the arms 155 and the first plane established by the top 156. The arms 155 may lie along a second plane that is parallel to the first plane. The rods 158 may twist downward such that the rods 158 are perpendicular to neither the top 156 nor the arms 155. The rods 158 may be parallel with each other, but are not parallel to the top 156 nor the arms 155.

In some embodiments, the diameter of the mixer 154 at the first end proximal to the top 156 is less than the diameter of the mixer 154 at the second end proximal to the arms 155. In some embodiments, the diameter of the mixer 154 at the first end proximal to the top 156 is greater than the diameter of the mixer 154 at the second end proximal to the arms 155. In some embodiments, the diameter of the mixer 154 at the first end proximal to the top 156 is equal to the diameter of the mixer 154 at the second end proximal to the arms 155.

Figure 13:
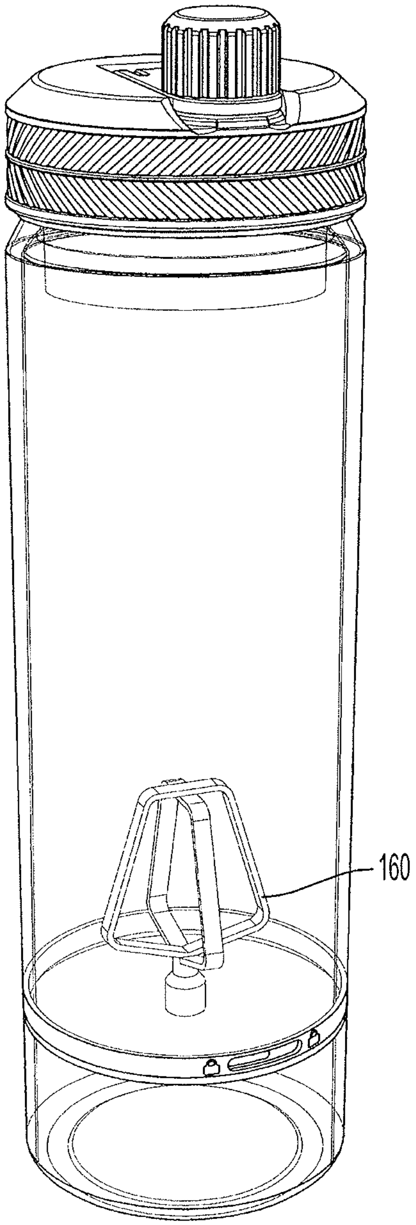
FIGS. 13 and 14 illustrate an alternate mixer, according to various embodiments of the invention.

FIG. 13 illustrates an alternate mixer 160 that may be used. The mixer 160 may be used to mix powders with liquids or to blend solids with liquids. The mixer 160 may be particularly effective for breaking down ice.

Figure 14:
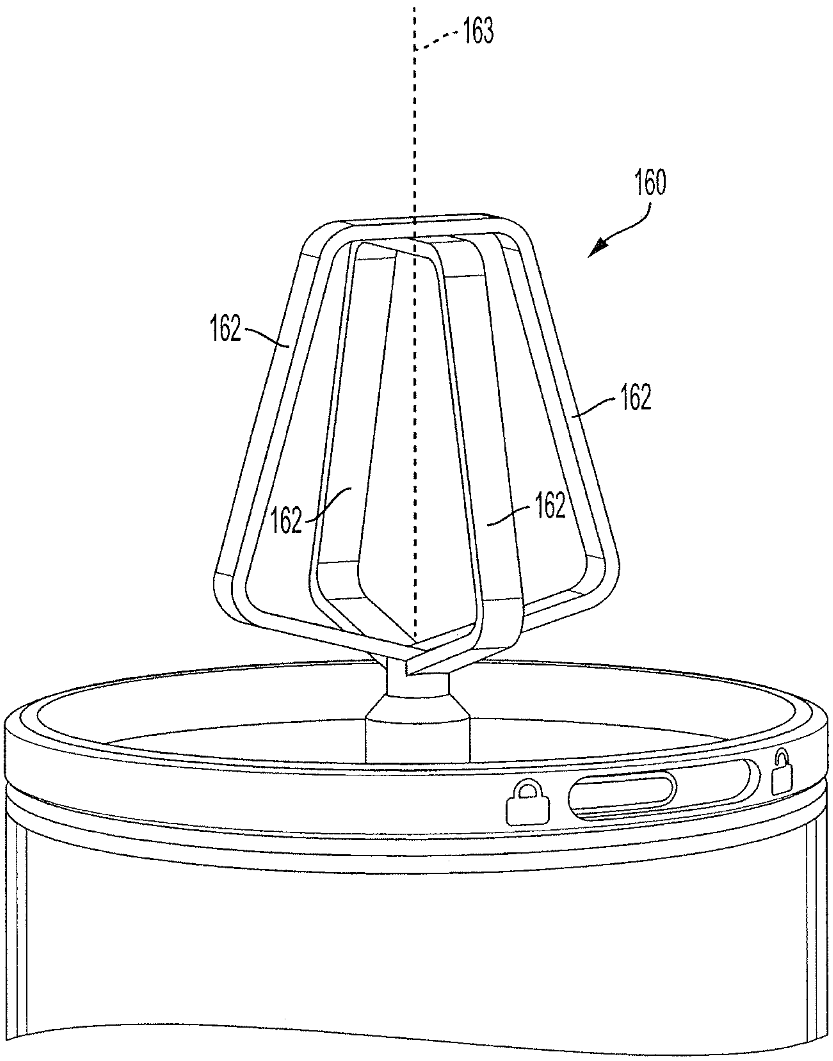

FIG. 14 illustrates a detailed view of the mixer 160. The mixer 160 may spin about a central axis 163 that the motor shaft is located on. The mixer 160 has four paddles/blades 162 that are arranged in a manner to blend solid objects when powered by the motor 146. The paddles/blades 162 may protrude outwardly from the shaft connected to the motor 146 (away from central axis 163) and may come together (toward central axis 163) at a point spaced apart from the motor 146. The paddles/blades 162 may be equally spaced apart (i.e., separated by 90 degrees when viewed axially along the central axis 163).

Figure 15:
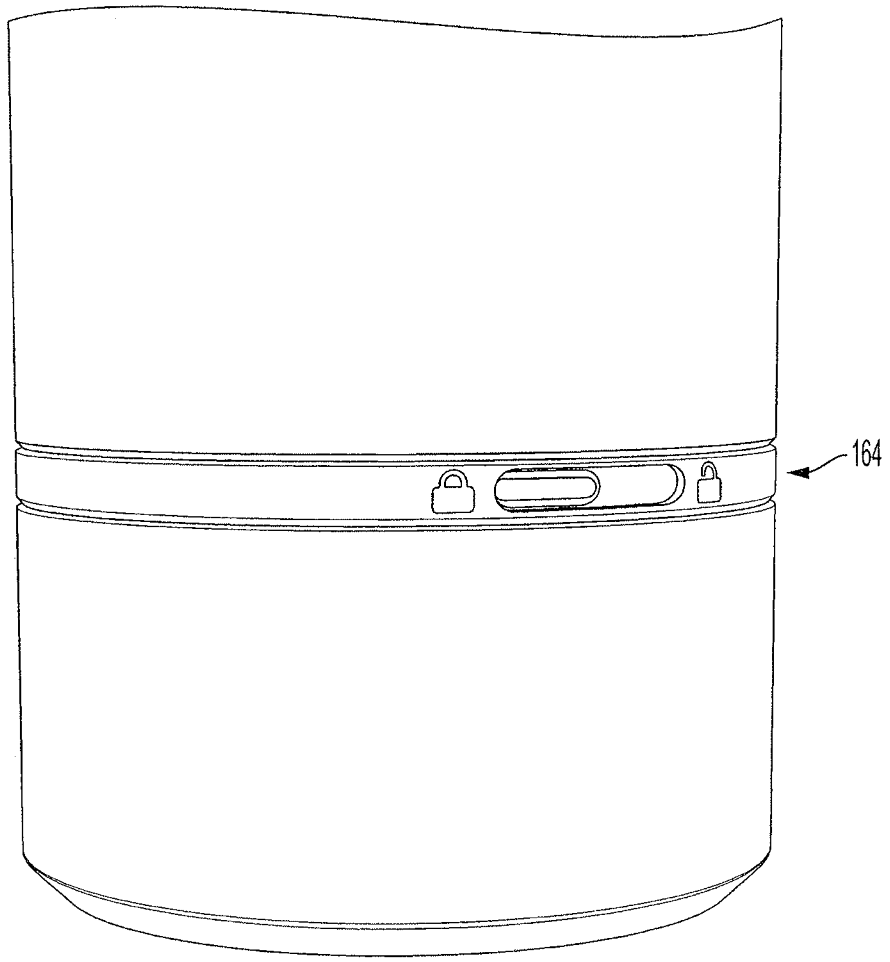
FIG. 15 illustrates an alternate power switch, according to various embodiments of the invention.

FIG. 15 illustrates an alternate power switch 164. Instead of a button (e.g., power switch 122), the power switch 164 is a sliding lever. The power switch 164 may be slid to activate powering of the motor 146 by the battery 148. The power switch 164 may remain on the powered end when slid, or may automatically return to the unpowered end when not engaged by the user.

Figure 16:
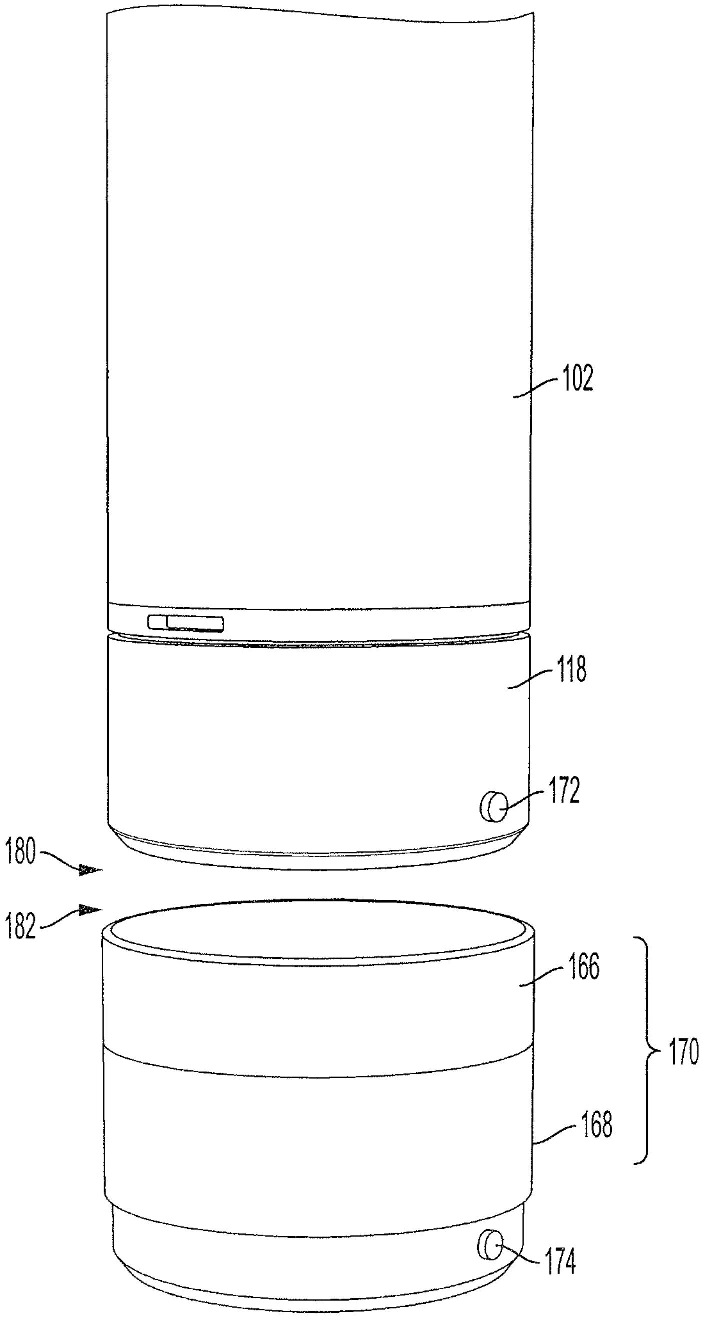
FIG. 16-19 illustrate a storage container to be attached to the bottle, according to various embodiments of the invention.

FIG. 16 illustrates an add-on container 170 that may be attached to the bottle 100. The container 170 includes a lid 166 and a body 168. The lid 166 prevents the bottom 180 of the bottle 100 from contacting the contents of the container 170. The lid 166 may have grooves that receive the key 172 of the base 118 to secure the container 170 to the bottle 100. The top end 182 of the lid 166 may receive the bottom 180 of the bottle 100. The container 170 may be insulated to keep its contents fresh, such as fruit or powders. The container 170 may have its own key 174 to attach to another container 170, allowing for stacking and securing of an endless number of containers.

Figure 17:
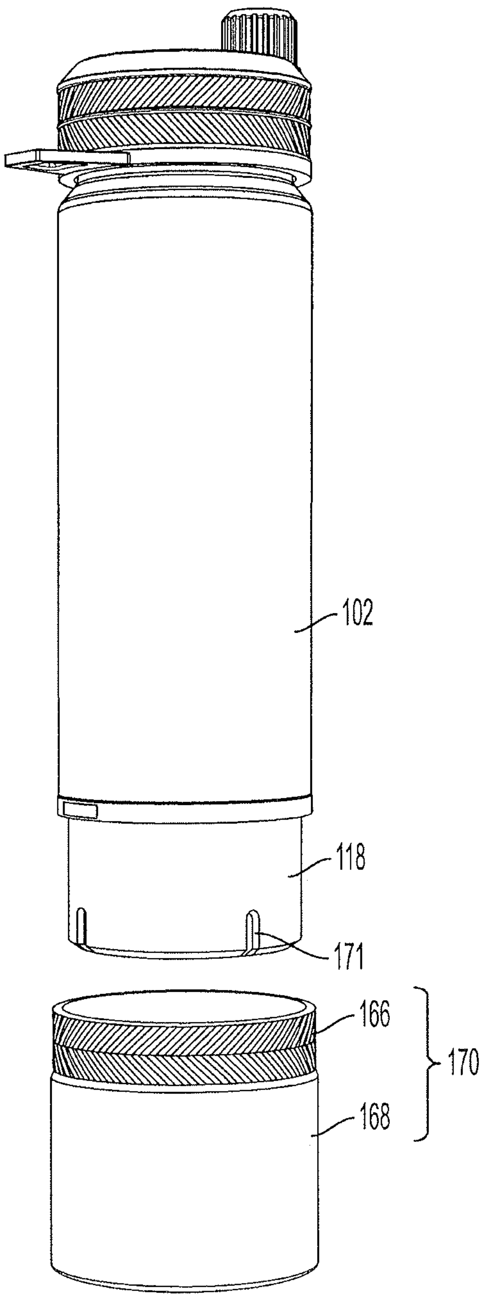

FIG. 17 shows an alternate add-on container 170 where the groove 171 is located on the base 118, and the lid 166 contains a corresponding key in the interior surface. The lid 166 may be made of rubber, silicone, plastic, or any other material. The add-on container 170 may be secured to the base 118 via interference fit using friction.

Figure 18:
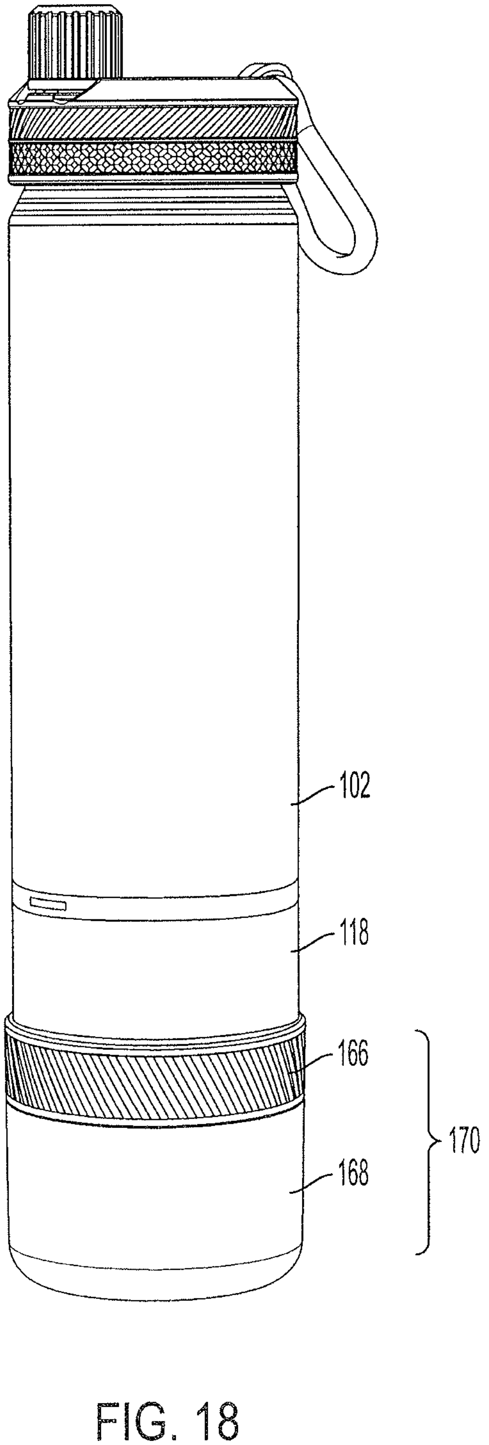

FIG. 18 shows the container 170 connected to the base 118 of the bottle 100. The container 170 being secured to the base 118 allows for carrying of additional ingredients and components to be stored for later use inside the bottle 100. For example, fresh fruit may be stored in the container 170 and may be added to the bottle 100 along with ice and a liquid to form a fruit-infused drink. The container 170 may be insulated to ensure freshness of the ingredients stored inside.

Figure 19:
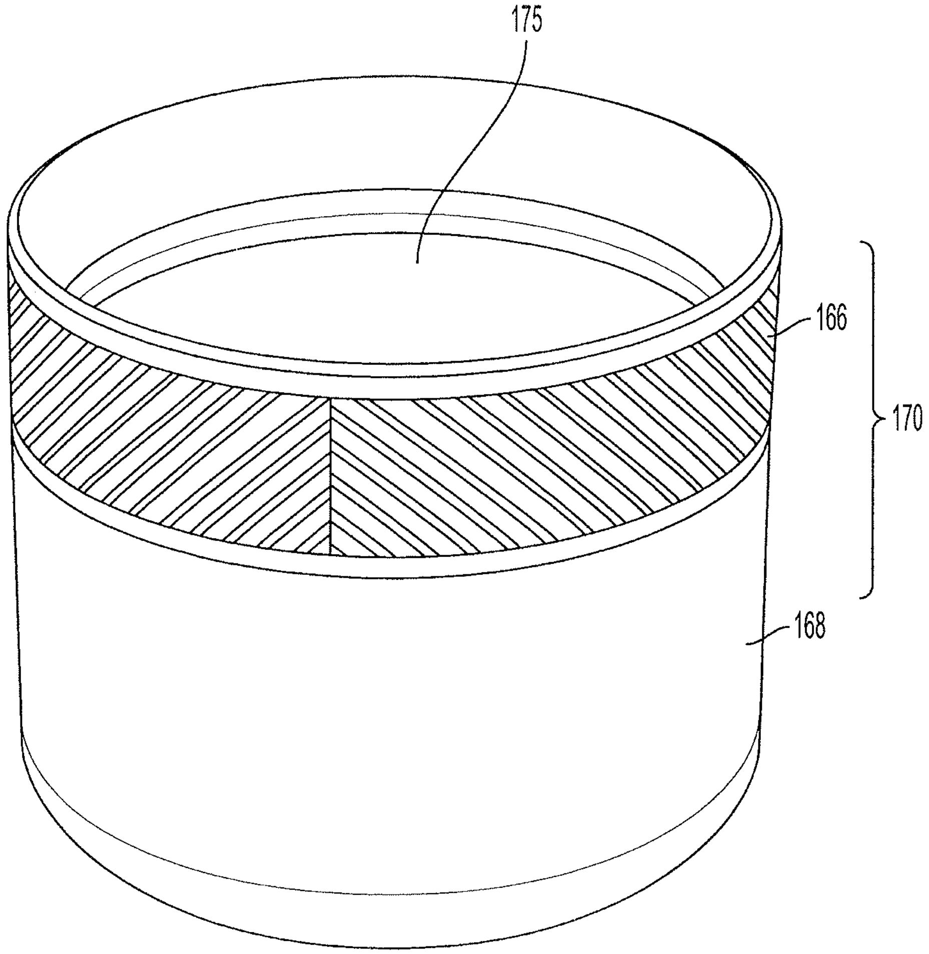

FIG. 19 shows the container 170. The lid 166 has a top surface 175 that prevents the bottom of the base 118 from contacting the contents stored within the body 168.

Figure 20:
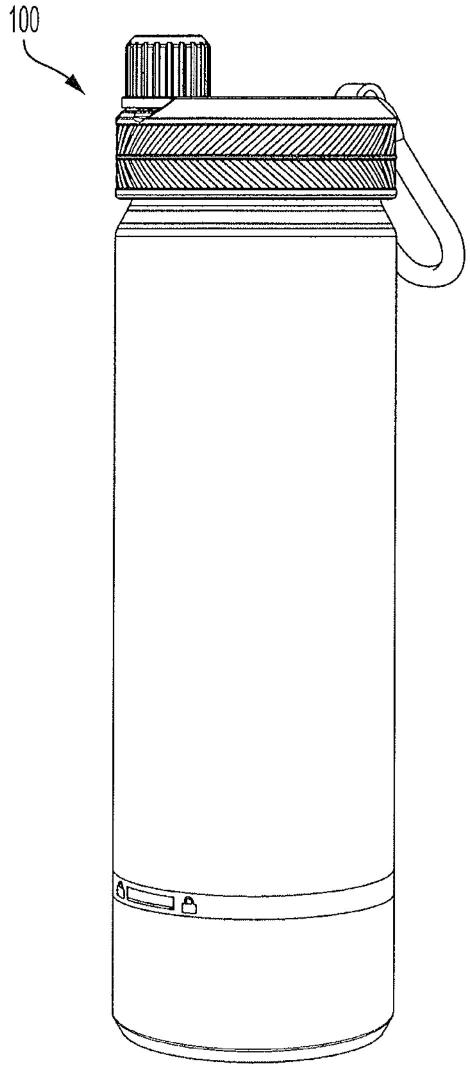
FIGS. 20 and 21 show side views of the bottle, according to various embodiments of the invention.
Figure 21:
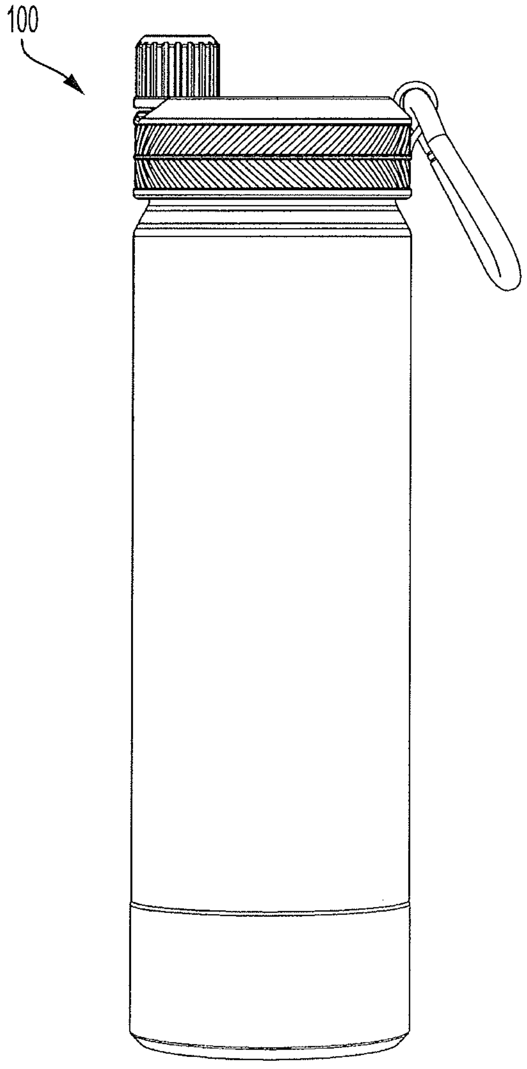

FIGS. 20 and 21 illustrate side views of the bottle 100, according to various embodiments described herein.

Figure 22:
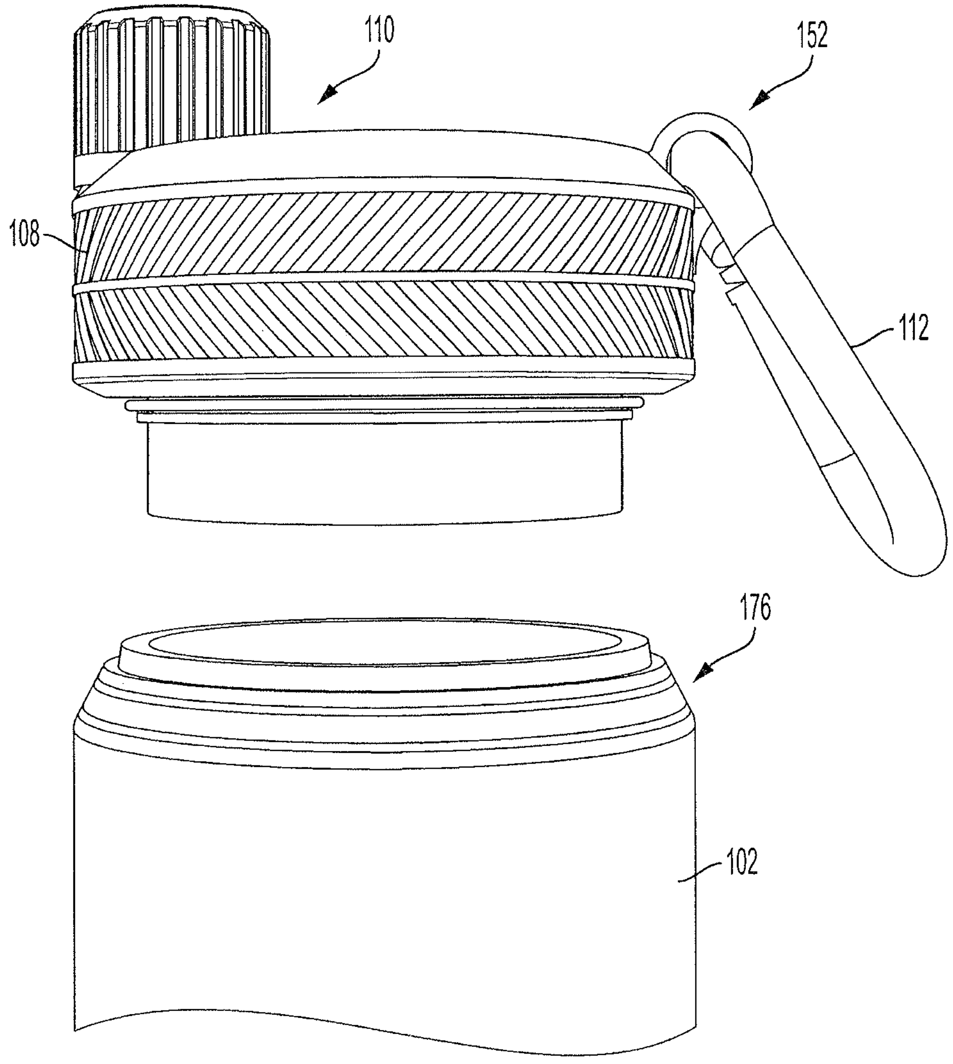
FIG. 22 illustrates the bottle lid removed from the bottle base, according to various embodiments of the invention.

FIG. 22 illustrates the bottle lid 108 separated from the bottle body 102. In some embodiments, the bottle body 102 has a slope 176 on the top end where the bottle body 102 connects to the bottle lid 108. The slope 176 is angled toward the central axis of the bottle 100. The bottle 100 may be easier to grasp at the sloped location, and the sloped feature may assist in separating the bottle lid 108 from the bottle body 102 by creating additional surface area for the user to grasp.

Figure 23:
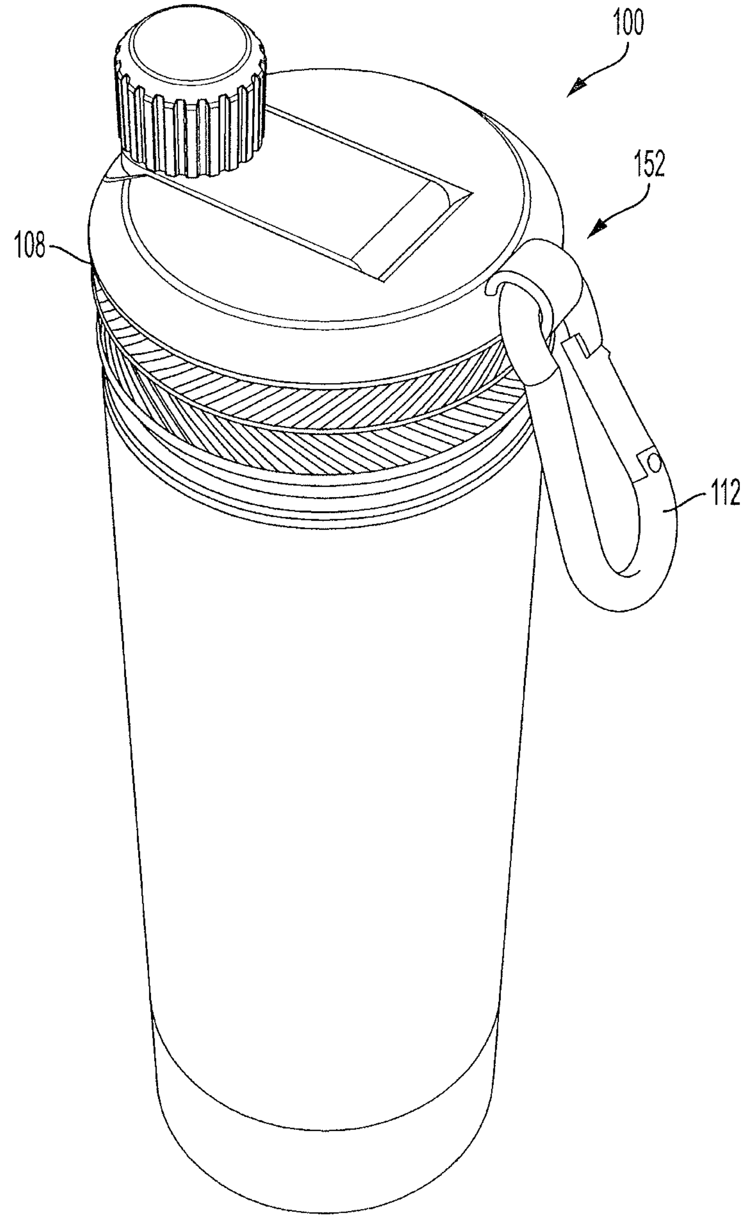
FIG. 23 illustrates a top perspective view of the bottle with a carabiner attached, according to various embodiments of the invention.

FIG. 23 illustrates a top perspective view of the bottle 100 with a carabiner 112 attached.

Figure 24:
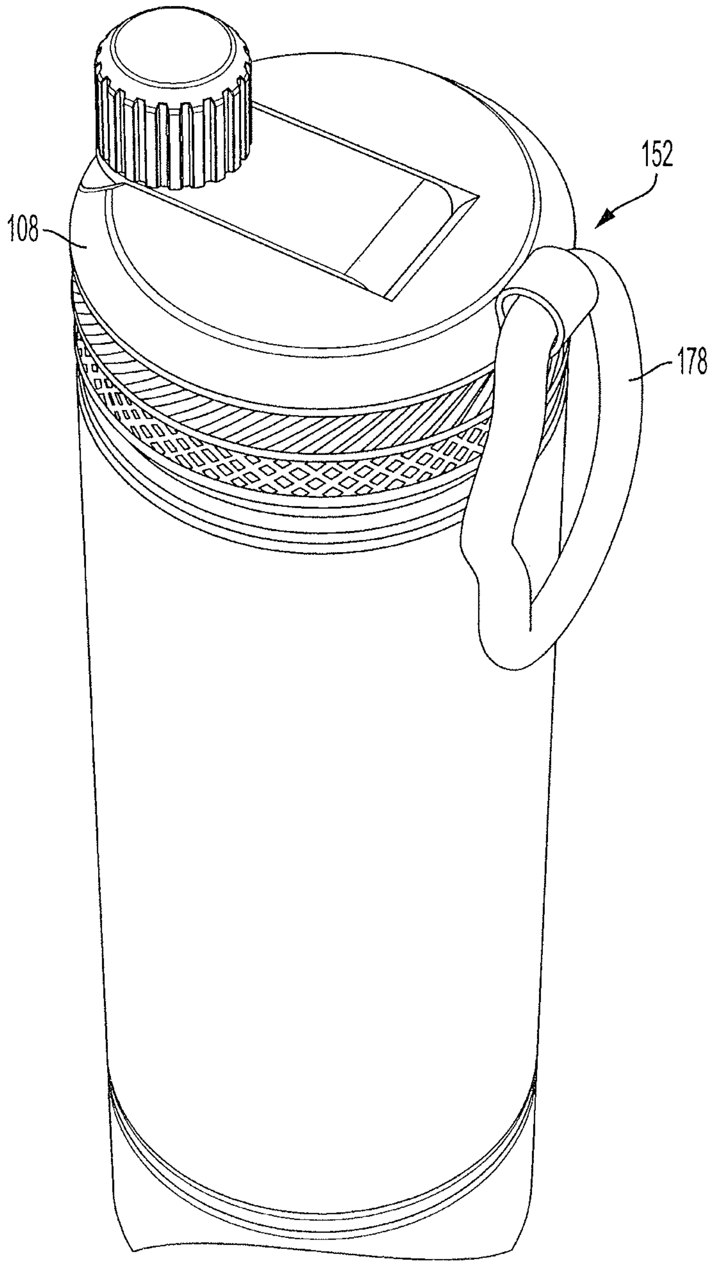
FIG. 24 illustrates a top perspective view of the bottle with a paracord attached, according to various embodiments of the invention.

FIG. 24 illustrates a top perspective view of the bottle 100 with a paracord 178 attached.

Figure 25:
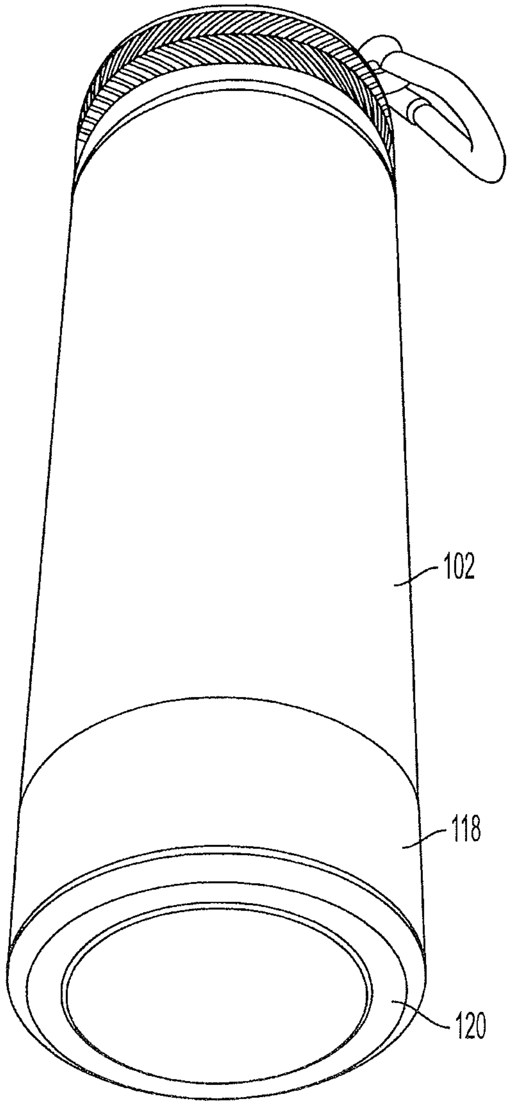
FIG. 25 illustrates a bottom perspective view of the bottle, according to various embodiments of the invention.

FIG. 25 illustrates a bottom perspective view of the bottle 100 showing the bottom ring 120. The bottom ring 120 may be made of any material capable of increasing friction between the bottom of the bottle and a flat surface. For example, the bottom ring 120 may be made of rubber or silicone. The bottom ring 120 discourages sliding of the bottle 100 along a flat surface.

Figure 26A:
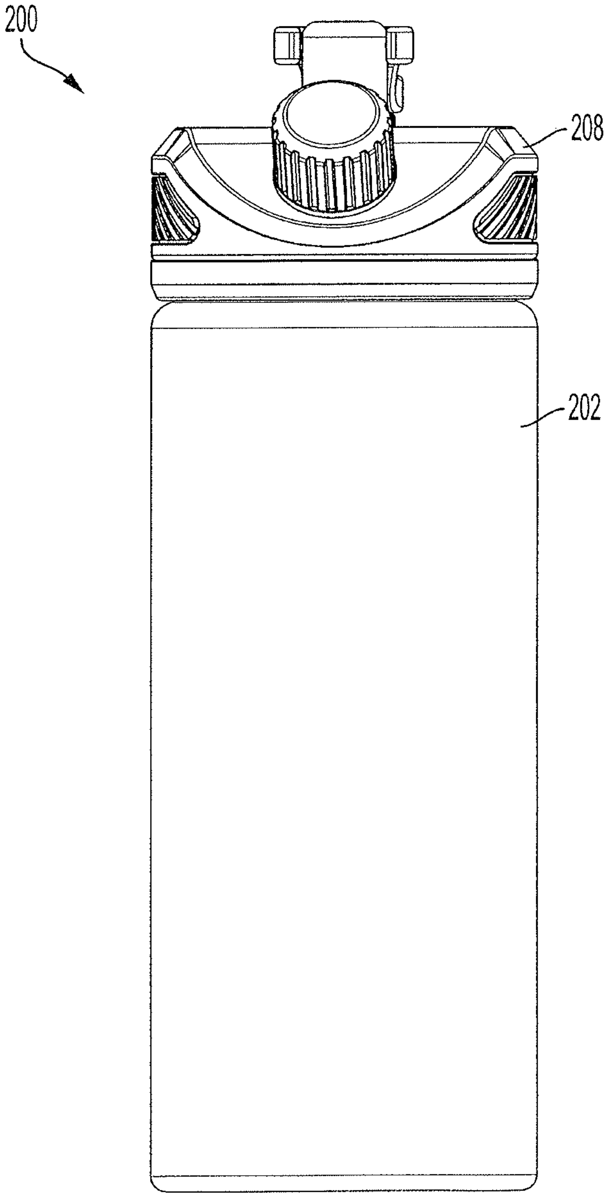
FIG. 26A illustrates a front view of a manual bottle, according to various embodiments of the invention.

FIG. 26A shows a manual (or "hand crank") bottle 200. The manual bottle 200 is powered by a user who turns a crank to mix and blend the contents of the bottle, as compared to the motor that powers the mixer 114 to mix and blend the contents of the bottle.

The bottle 200 has a bottle lid 208 similar to bottle lid 108 and a bottle body 202 similar to bottle body 102. The bottle lid 208 attaches to the top of the bottle body 202.

Figure 26B:
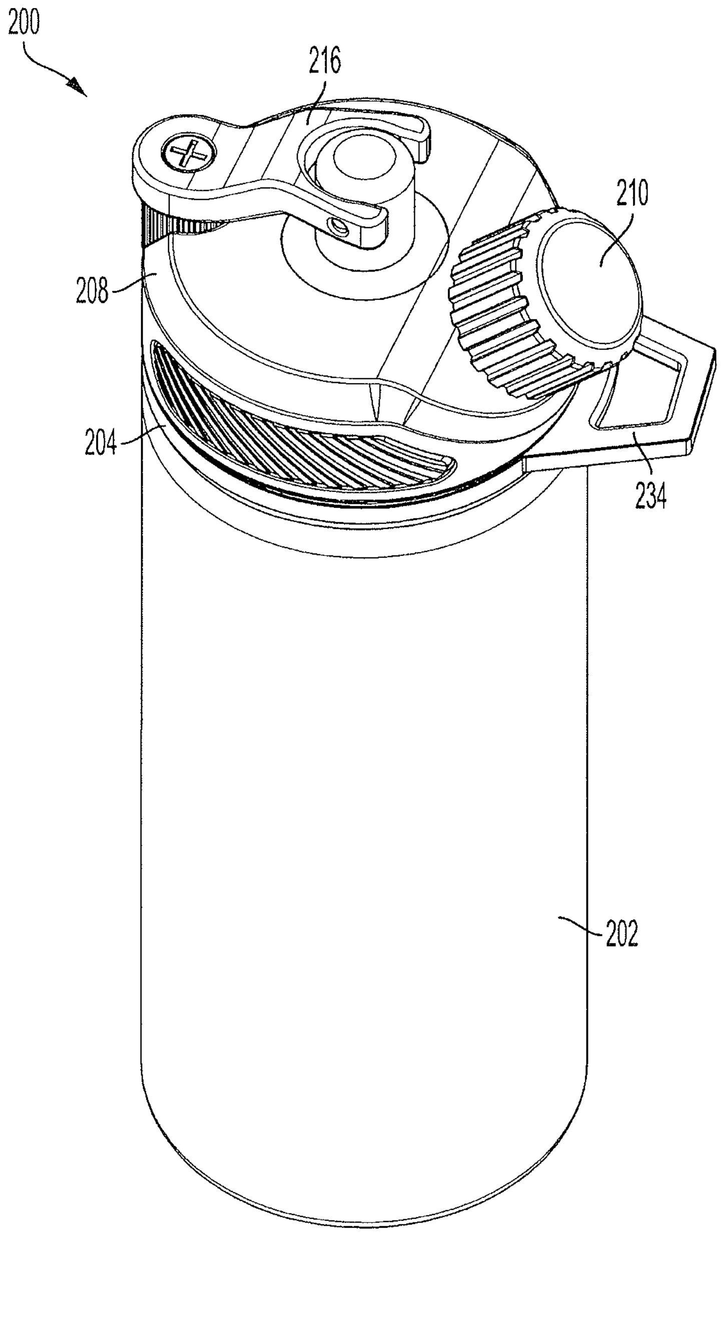
FIG. 26B illustrates a top perspective view of a manual bottle, according to various embodiments of the invention.

FIG. 26B shows an elevated perspective view of the manual bottle 200. The manual bottle 200 includes a cap 210 attached to the bottle lid 208 and covering a mouthpiece, as well as a crank 216 attached to the bottle lid 208. As shown in FIGS. 26A and 26B, the crank 216 is in a stowed position, but may be changed to a deployed position for mixing, as described further herein.

The bottle 200 may also include an attaching ring 204 similar to attaching ring 104. Attaching ring 204 has an attaching loop 234 similar to attaching ring 104 and attaching loop 134. The attaching ring 204 may be located in a groove between the bottle lid 208 and the bottle body 202, and may rotate about a central axis of the bottle 200, around a circumference of the bottle 200.

Figure 27:
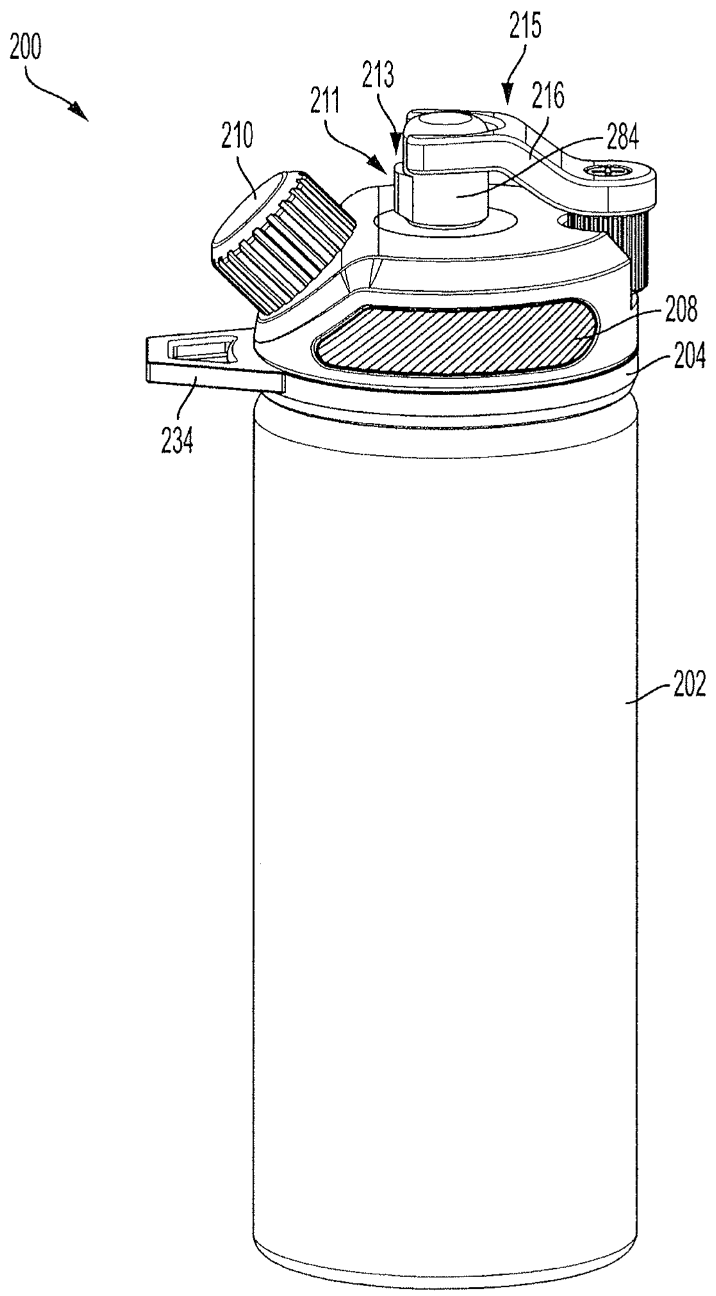
FIG. 27 illustrates a side view of a manual bottle, according to various embodiments of the invention.

FIG. 27 shows a side view of the bottle 200. The bottle lid 208 contains a hub 284 connecting the crank 216 to the top of the bottle lid 208. The hub 284 remains stationary while the crank 216 rotates about a central axis.

The hub 284 includes a bumper 211. The bumper 211 is located proximal to the mouthpiece of the bottle lid 208 and prevents collisions of the crank 216 and the mouthpiece or the cap 210 as the crank 216 is being rotated. More specifically, a top surface 213 of the bumper 211 contacts the bottom surface 215 of the crank 216 when the crank 216 is in the deployed position (shown in FIG. 30A) and prevents the crank 216 from contacting the cap 210.

Figure 28:
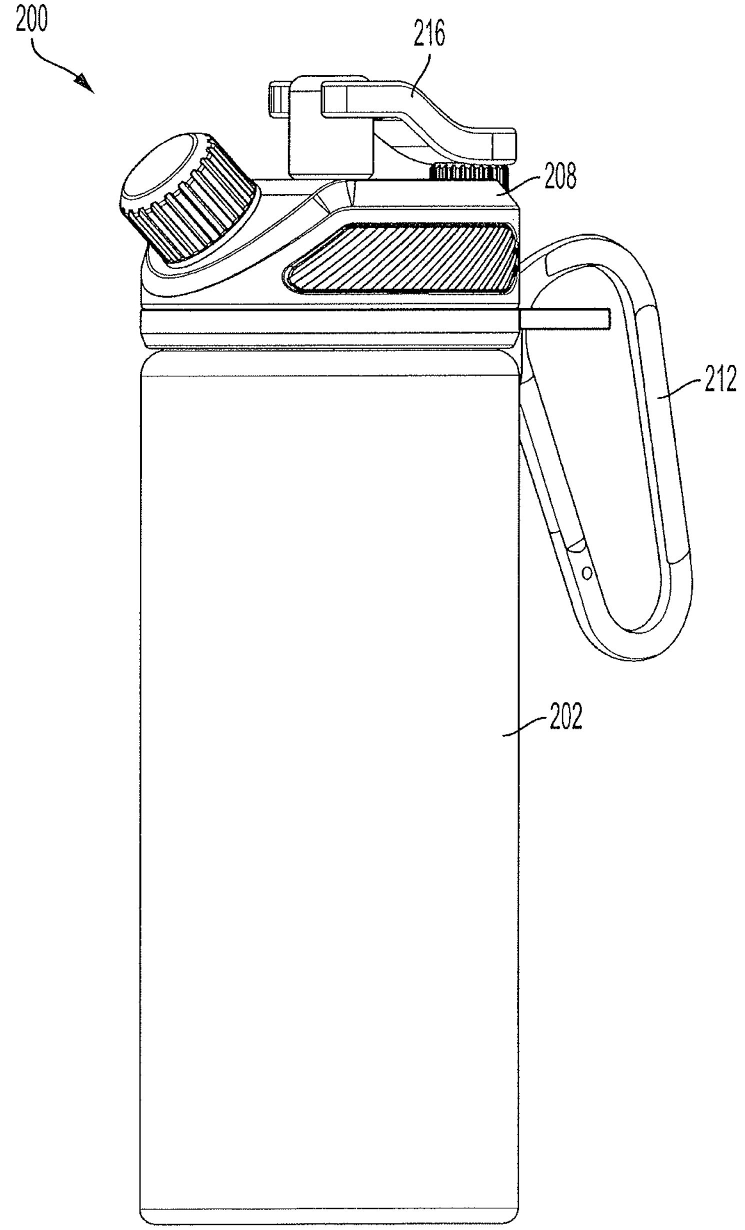
FIG. 28 illustrates a front view of a manual bottle, according to various embodiments of the invention.

FIG. 28 shows another front view of the bottle 200 with the crank 216 in the stowed position and a carabiner 212 attached to the bottle 200.

Figure 29:
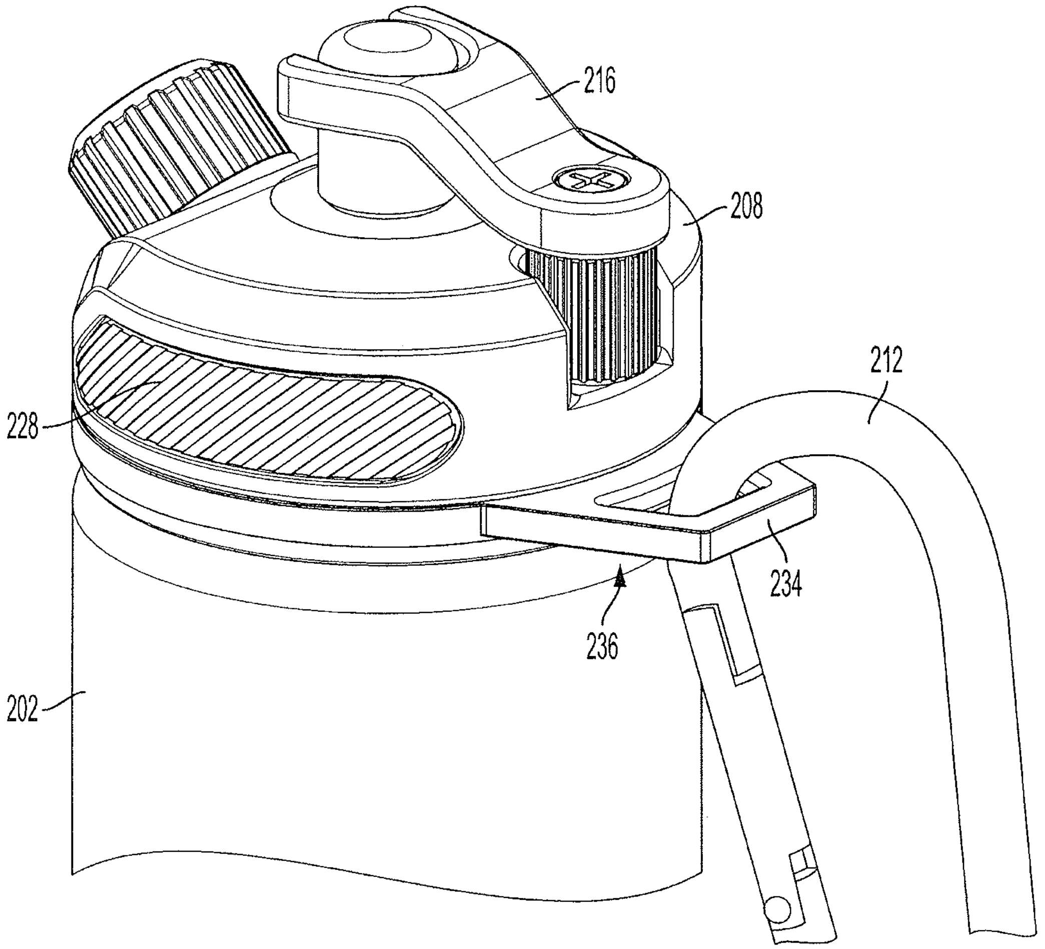
FIG. 29 illustrates the bottle lid, according to various embodiments of the invention.

FIG. 29 shows the bottle 200 having a carabiner 212 engaged with the attaching loop 234 via the opening 236. The bottle lid 208 has one or more grip portions 228 similar to gripping surface 128. The one or more grip portions 228 are configured to assist in attaching and detaching the bottle lid 208 from the bottle body 202. The user may grasp the one or more grip portions 228 when attaching and detaching the bottle lid 208 from the bottle body 202 (e.g., by twisting the bottle lid 208 and the bottle body 202 in different rotational directions).

Figure 30A:
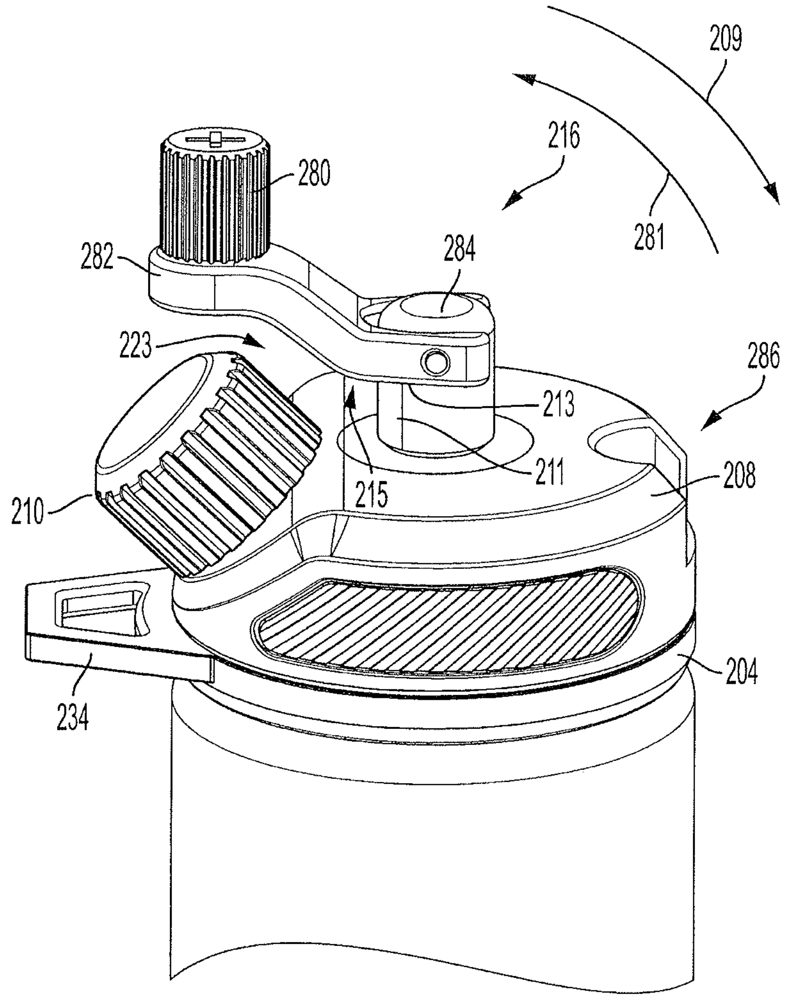
FIGS. 30A-30C illustrate the manual bottle with a crank in a deployed position, according to various embodiments of the invention.

FIG. 30A shows the crank 216 in the deployed position. The crank 216 includes a handle 280, a lever 282, and a hub 284. The handle 280 may be spun about the hub 284 to turn a mixer located inside the bottle 200 and attached to the hub 284. The handle 280 of the crank 216 may be received by a slot 286 in the stowed position as shown in FIG. 29.

As described herein, the hub 284 includes a bumper 211 that prevents the lever 282 from contacting the cap 210 when the crank 216 is turned. The top surface 213 of the bumper 211 contacts the bottom surface 215 of the lever 282. The bottom surface 215 of the lever 282 is parallel with the top surface 213 of the bumper 211 as well as the top surface of the bottle lid 208 when the crank 216 is in the deployed position. The bumper 211 creates a clearance channel 223 located between the cap 210 and the lever 282 and allows the crank 216 to be turned without contacting the cap 210.

The lever 282 has an offset shape, as shown in FIG. 30A, with a first end connected to the hub 284 that is lower than a second end connected to the handle 280 when the crank is in the deployed position. The offset shape also allows a reduced profile of the bottle 200 when the crank is in the stowed position. When the crank 216 is in the stowed position, the second end connected to the handle 280 is lower than the first end connected to the hub 284.

The crank 216 may be moved from the stowed position to the deployed position by pivoting the crank 216 in a direction 281 away from the slot 286 and toward the cap 210. The crank 216 may be moved from the deployed position by pivoting the crank 216 in a direction 209 away from the cap 210 and toward the slot 286.

Figure 30B:
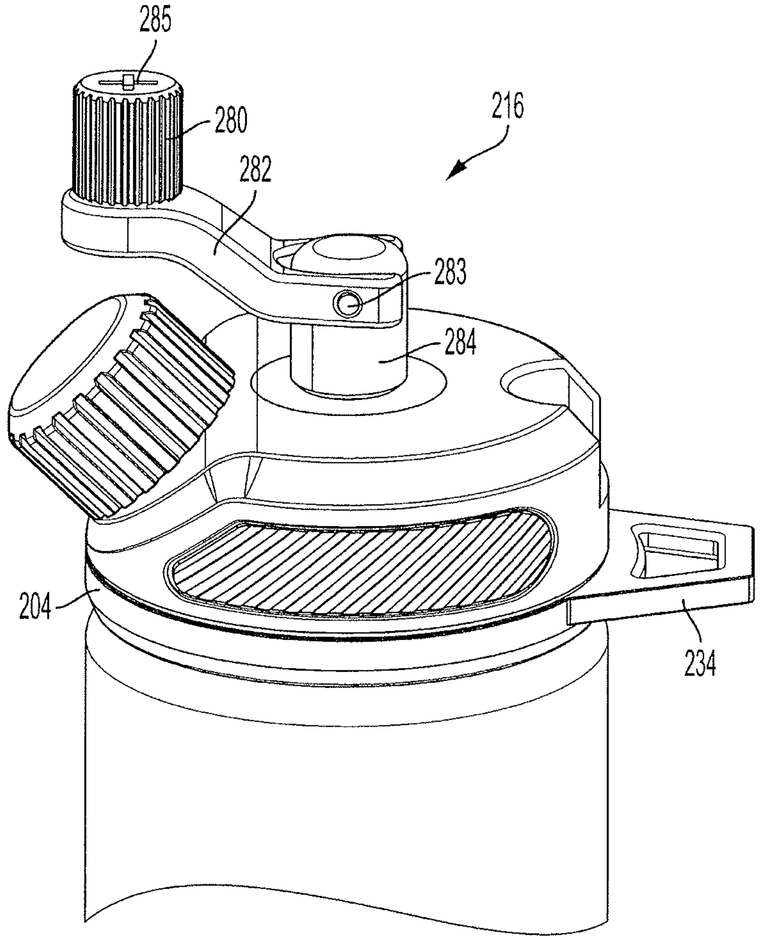

FIG. 30B shows the lever 282 connected to the hub 284 via a pin 283, which allows the crank 216 to be moved between the deployed position and the stowed position, as described herein. On an opposite end of the lever 282, the lever 282 is connected to the handle 280 via a connector 285. The handle 280 may rotate about the connector 285 so that when a user turns the handle 280 around the hub 284, the handle 280 does not move within the grasp of the user, relative to the user's fingers.

Figure 30C:
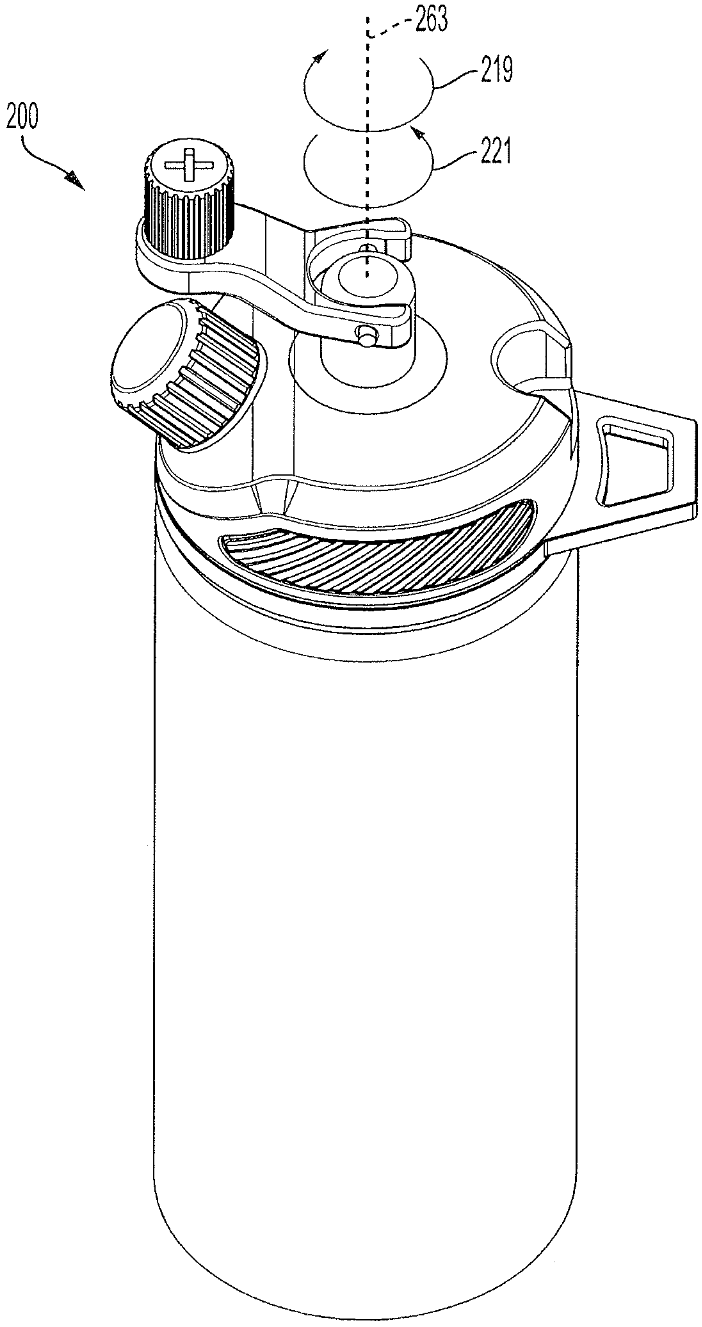

FIG. 30C shows the crank 216 may be turned in a first rotational direction 219 or a second rotational direction 221 about a central axis 263 of the bottle 200.

Figure 30D:
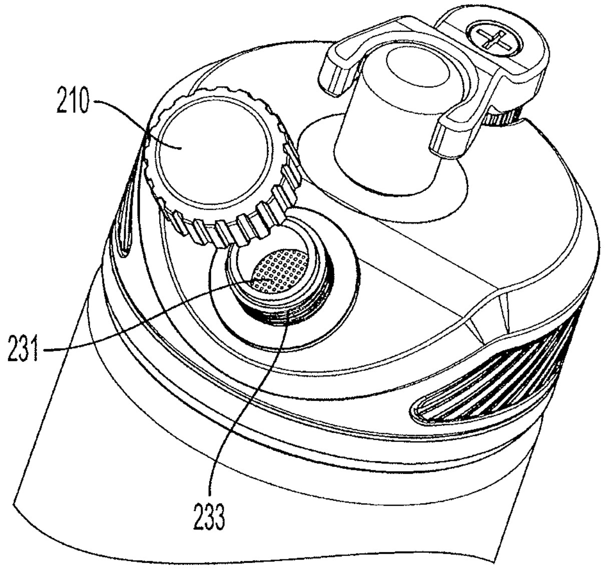
FIG. 30D illustrates a filter of a manual bottle, according to various embodiments of the invention.

FIG. 30D shows the cap 210 separated from the mouthpiece 233. The cap 210 and the mouthpiece 233 may have complementary threading to allow the cap 210 to be rotatably secured to the mouthpiece 233. There may also be a filter 231 similar to filter 142 located in the mouthpiece 233. The filter 231 may be attached to the mouthpiece 233 and/or the bottle lid in a similar manner as the filter 142, described herein.

Figure 30E:
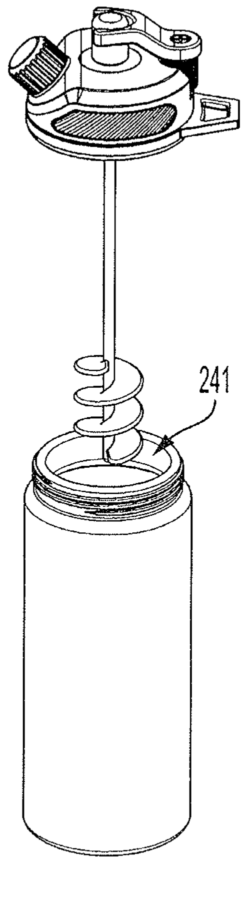
FIG. 30E illustrates a bottle lid removed from a bottle body, according to various embodiments of the invention.

FIG. 30E illustrates the bottle lid 208 separated from the bottle body 202. The bottle body 202 defines a cavity 241 for storage and mixture of liquids and solids.

Figure 31A:
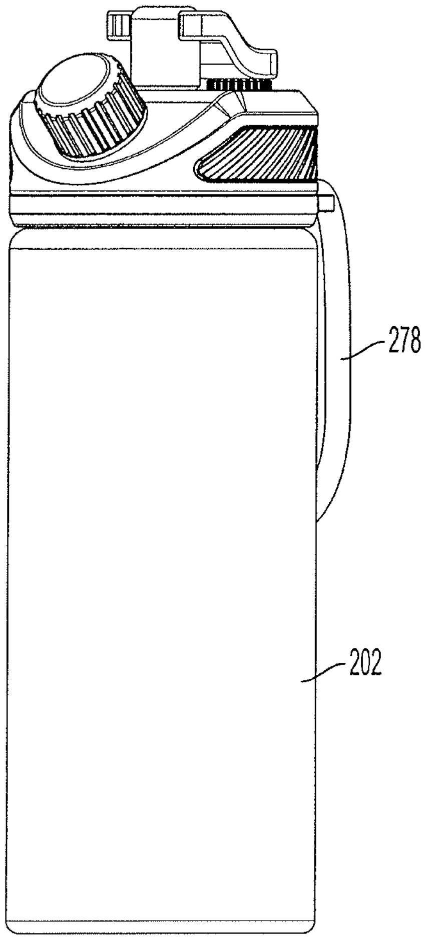
FIGS. 31A-31B illustrate the manual bottle with an auger mixer, according to various embodiments of the invention.
Figure 31B:
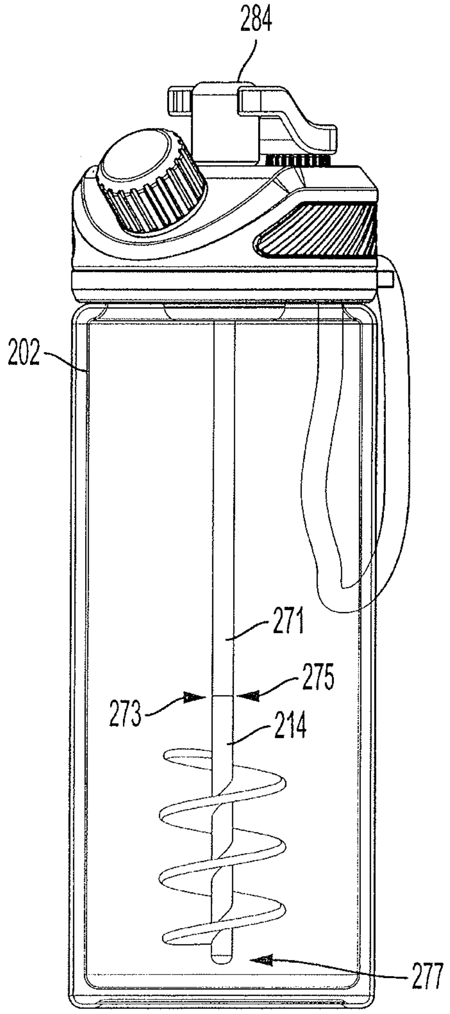

FIG. 31A illustrates the exterior of the bottle 200 with a paracord 278 attached and FIG. 31B illustrates the interior of the bottle 200. The mixer 214 is shown within the bottle body 202. The mixer 214 is removably attached to a shaft 271 that is connected to the hub 284. Thus, when the handle is turned, as shown in FIG. 30C, the lever 282 is also turned, which turns the shaft 271 and the mixer 214. The mixer 214 may be a general-purpose mixer similar to mixer 114. A gearbox may be contained in the bottle lid 208 configured to translate one rotation of the crank 216 into multiple rotations of the shaft 271 and mixer 214.

The mixer 214 may be removably attached to the shaft 271 at an attachment location 273, similar to the mixer 114 removably attached to the motor 146. In some embodiments, the mixer 214 has an opening at a first end of the shaft of the mixer 214, and the opening includes threading around the interior of the opening. The threading is configured to receive corresponding threading around the shaft 271. Thus, the mixer 214 (shown as an auger) may be removed and replaced with another mixer of a different configuration (e.g., a whisk).

The mixers used with the motorized bottle 100 may be interchangeably used with the hand crank bottle 200. That is, the threading of the shaft 271 that connects the shaft 271 to the mixer 214 is similar to the threading of the shift of the motor 146. Similarly, the threading around the mixer 214 is similar to the threading around the mixer 114. Whereas the base 275 of the mixer 214 is above the tip 277 of the mixer 214 in the hand crank bottle 200, if the mixer 214 were used in the motorized bottle 100, the base 275 of the mixer 214 would be below the tip 277 of the mixer 214.

The interchangeability of the mixers between the motorized bottle 100 and the hand crank bottle 200 allows the user to purchase a single set of mixers and use them in either the motorized bottle 100 or the hand crank bottle 200, providing a cost savings to the user.

Figure 32A:
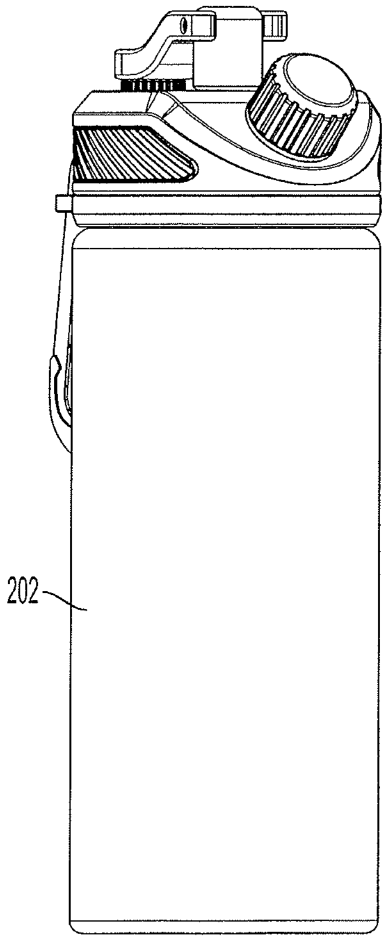
Figure 32B:
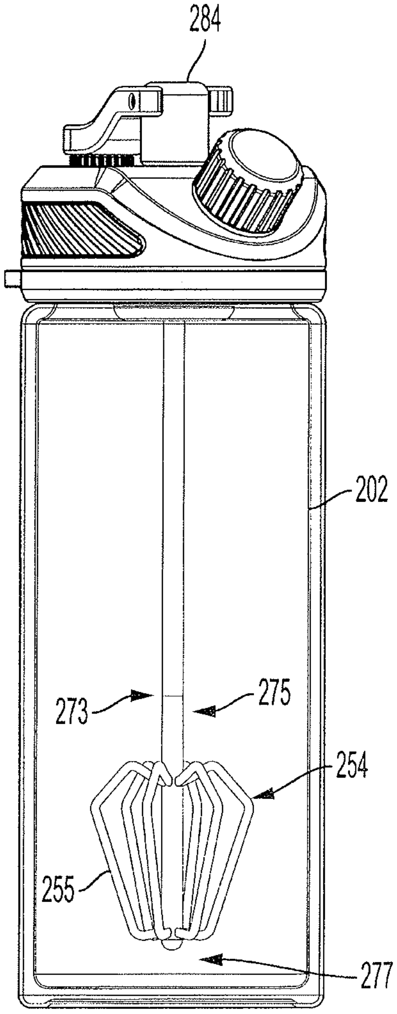

FIG. 32A illustrates the exterior of the bottle 200 and FIG. 32B illustrates the interior of the bottle 200 with an alternate mixer 254 attached. The alternate mixer 254 may be a cone mixer and used for mixing powders and liquids, similar to mixer 154. In some embodiments, mixer 154 or mixer 160 may be used in bottle 200. The alternate mixer 254, and any mixers described herein (e.g., mixers 114, 154, 160) may be used in the bottle 200 as described herein with respect to mixer 214.

Similarly, mixer 254 may be used with the motorized bottle 100. The mixer 254 has a plurality of arms 255 equally spaced around a circumference of the mixer 254. In some embodiments, there are six arms 255. Each arm may be connected to the shaft of the mixer 254 at a location proximal to the base 275 of the mixer 254 and at a location proximal to the tip 277 of the mixer 254. Each arm may protrude from the shaft of the mixer 254, extend toward the base 275 of the mixer 254, bend at an angle toward the tip 277 of the mixer 254 and away from a central axis of the shaft 271, bend toward the tip 277 and toward the central axis of the shaft 271, and connect to the tip 277 of the mixer 254.

This particular configuration of arms 255 may allow for air to be incorporated into the liquid, as well as breaking down and mixture of the contents of the bottle body 202.

Figure 33:
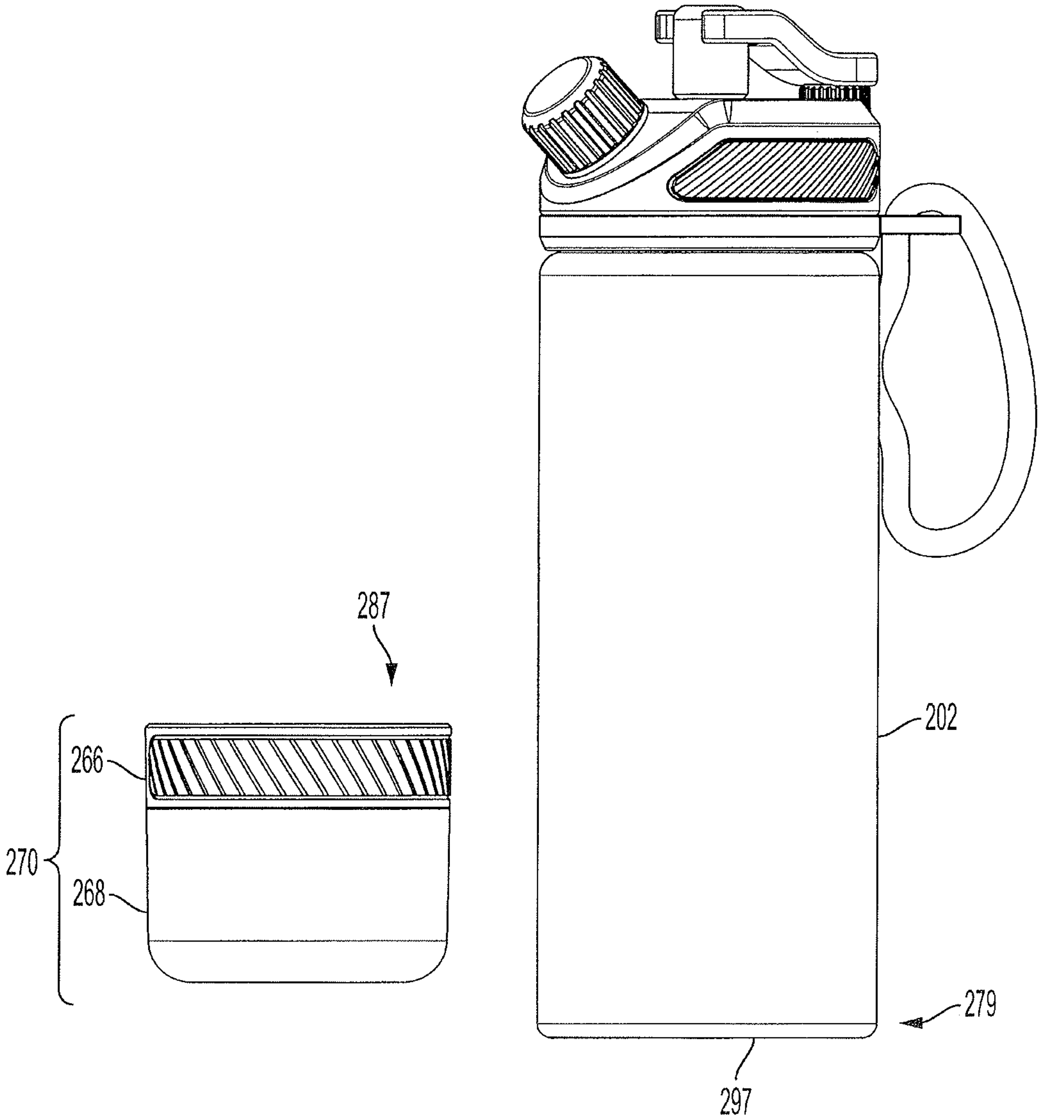
FIGS. 33-34 illustrate the manual bottle with a storage container, according to various embodiments of the invention.

FIG. 33 illustrates a container 270 similar to container 170. Container 270 has a lid 266 similar to lid 166 and a body 268 similar to body 168. The bottom end 279 of the bottle body 202 is configured to connect to the top end 287 of the container 270 in a similar manner as described herein with respect to container 170 and base 118. In some embodiments, a single container may be used with both the motorized bottle 100 and the hand crank bottle 200.

The bottle 200 may also have a bottom ring 297 attached to the bottom end 279 of the bottle body 202, similar to bottom ring 120 of the motorized bottle 100.

Figure 34:
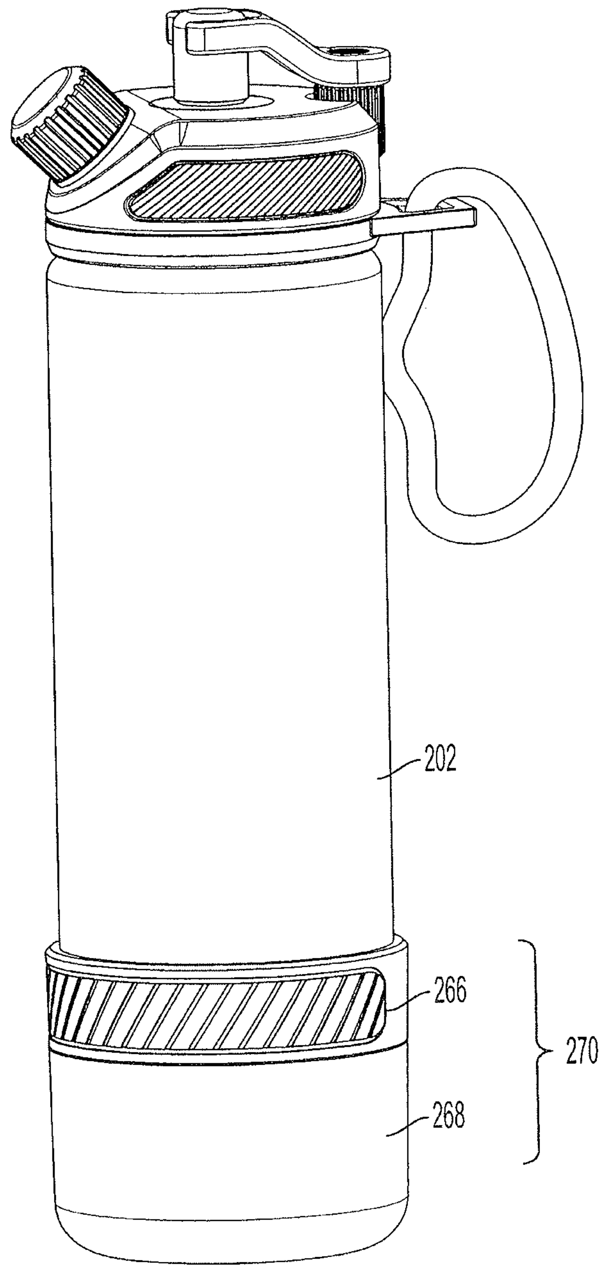

FIG. 34 illustrates the bottle body 202 connected to the container 270.

Any of the components described herein (e.g., bottle body, bottle lid, crank, mixer) may be made of a durable, rigid material, such as steel or plastic.

When any mixer (e.g., mixer 114) is referenced, any other mixer (e.g., mixer 154, 160, 254) may be interchangeably used.

The mixer, when in the motorized bottle 100, may be located proximal to the bottom end of the bottle body, with the tip end of the mixer located above the base end of the mixer. The mixer, when in the hand crank bottle 200, may be located proximal to the bottom end of the bottle body, with the base end of the mixer located above the tip end of the mixer.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A bottle for mixing or blending contents of the bottle into a liquid or semi-liquid, the bottle comprising:

a bottle body defining a cavity for receiving the contents of the bottle;

a bottle lid configured to cover a top opening of the bottle body;

a mixer located within the bottle body for mixing or blending the contents of the bottle;

a crank having a handle and a lever, being connected to the bottle lid, and being configured to turn around a central axis of the bottle, the turning causing the mixer to spin and mix or blend the contents of the bottle; and a shaft connecting the crank and the mixer, the shaft located along the central axis of the bottle and configured to turn when the crank is turned, the mixer being removably attached to the shaft via respective threads located on the shaft and the mixer, wherein the handle of the crank is connected to a first end of the lever and the second end of the lever is coupled to a hub, wherein the hub includes a bumper configured to prevent the lever of the crank from contacting a cap covering a mouthpiece of the bottle lid when the crank is being turned around the central axis, wherein the crank is configured to be in a stowed position or a deployed position, and wherein the handle of the crank is located in a slot of the bottle lid when the crank is in the stowed position.

2. The bottle of claim 1, wherein the lever is coupled to the hub via a pin, the pin configured to allow the lever to rotate around an axis perpendicular to the central axis when the crank moves between the stowed position and the deployed position.

3. The bottle of claim 1, further comprising a removable filter connected to the mouthpiece.

4. The bottle of claim 1, wherein the bumper includes a top surface configured to contact a bottom surface of the lever when the crank is in the deployed position to establish a channel providing clearance around the cap when the crank is turned.

5. The bottle of claim 1, wherein the slot is located on an opposite side of the bottle lid as the cap.

6. The bottle of claim 1, wherein the mixer is located proximal to a bottom end of the bottle body within the bottle body and a tip end of the mixer is located below a base end of the mixer, the base end of the mixer attached to the shaft.

7. The bottle of claim 1, wherein the mixer is a helix mixer having a tip end and a base end, the mixer comprising:

a top having a circular shape and located proximal to the tip end, a plurality of rods connected to a perimeter of the top and equally spaced around a circumference of the top, and a plurality of arms located proximal to the base end, the arms protruding perpendicularly outwardly from a central shaft of the mixer, each arm of the plurality of arms connected to a respective rod of the plurality of rods, the rods having a twisting shape around a circumference of the mixer.

8. The bottle of claim 1, wherein the mixer is a cone mixer having a tip end and a base end, the mixer comprising a plurality of arms connected at a first end proximal to the tip end of the mixer and connected at a second end proximal to the base end of the mixer, the plurality of arms equally spaced around a circumference of the mixer, and wherein each arm of the plurality of arms protrudes from a shaft of the mixer, extends toward the base end of the mixer, bends toward the tip end of the mixer and away from the shaft of the mixer, bends toward the tip end of the mixer and toward the shaft of the mixer, and connects to the tip end of the mixer.

9. A bottle for mixing or blending contents of the bottle into a liquid or semi-liquid, the bottle comprising:

a bottle body defining a cavity for receiving the contents of the bottle;

a bottle lid configured to cover a top opening of the bottle body;

a mixer located within the bottle body for mixing or blending the contents of the bottle;

a crank having a handle and a lever, being connected to the bottle lid, and being configured to turn around a central axis of the bottle, the turning causing the mixer to spin and mix or blend the contents of the bottle;

a shaft connecting the crank and the mixer, the shaft located along the central axis of the bottle and configured to turn when the crank is turned, the mixer being removably attached to the shaft via respective threads located on the shaft and the mixer, a bottom ring connected to a bottom end of the bottle body and configured to prevent the bottle from sliding along a surface;

an attaching ring located between the bottle lid and the bottle body and having an opening configured to receive a carabiner or a paracord;

a grip located on the bottle lid and configured to aid in a user grasping the bottle lid to remove and attach the bottle lid to and from the bottle body; and a gearbox located within the bottle lid configured to translate a single revolution of the crank to multiple revolutions of the shaft wherein the handle of the crank is connected to a first end of the lever and the second end of the lever is coupled to a hub, wherein the crank is configured to be in a stowed position or a deployed position, and wherein the handle of the crank is located in a slot of the bottle lid when the crank is in the stowed position.

10. The bottle of claim 1, further comprising a storage container configured to engage a bottom end of the bottle body, the storage container having a removable lid to protect contents of the storage container and configured to store ingredients to be mixed or blended using the bottle.

* * * * *